(12) United States Patent
Mazzagatte et al.

(10) Patent No.: US 7,454,796 B2
(45) Date of Patent: Nov. 18, 2008

(54) OBTAINING TEMPORARY EXCLUSIVE CONTROL OF A PRINTING DEVICE

(75) Inventors: Craig Mazzagatte, Aliso Viejo, CA (US); Don Hideyasu Matsubayashi, Monterey, CA (US); Royce E. Slick, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1212 days.

(21) Appl. No.: 09/747,097

(22) Filed: Dec. 22, 2000

(65) Prior Publication Data

US 2002/0083114 A1 Jun. 27, 2002

(51) Int. Cl.
 *G06F 17/30* (2006.01)
(52) U.S. Cl. .................... 726/28; 726/17; 726/4
(58) Field of Classification Search .......... 358/1.15, 358/1.1; 709/219, 206, 224; 713/176; 726/4, 726/17, 28
 See application file for complete search history.

(56) References Cited

U.S. PATENT DOCUMENTS

| | | | | |
|---|---|---|---|---|
| 5,128,772 A | 7/1992 | Farrell et al. | ............... | 358/300 |
| 5,392,351 A | 2/1995 | Hasebe et al. | ............... | 380/4 |
| 5,493,692 A | 2/1996 | Theimer et al. | ............ | 455/26.1 |
| 5,506,945 A | 4/1996 | Coutand | ................. | 395/114 |
| 5,535,009 A | 7/1996 | Hansen | ................... | 358/296 |
| 5,537,626 A | 7/1996 | Kraslavsky et al. | ....... | 395/828 |
| 5,544,321 A | 8/1996 | Theimer et al. | ......... | 395/200.11 |
| 5,555,376 A | 9/1996 | Theimer et al. | ......... | 395/200.09 |
| 5,559,933 A | 9/1996 | Boswell | ................... | 395/114 |
| 5,603,054 A | 2/1997 | Theimer et al. | ............ | 395/826 |
| 5,606,613 A | 2/1997 | Lee et al. | ................... | 380/21 |
| 5,611,050 A | 3/1997 | Theimer et al. | ......... | 395/200.09 |
| 5,613,160 A | 3/1997 | Kraslavsky et al. | ....... | 395/836 |
| 5,633,932 A * | 5/1997 | Davis et al. | ................ | 713/176 |

(Continued)

FOREIGN PATENT DOCUMENTS

EP 0 598 509 5/1994

(Continued)

OTHER PUBLICATIONS

Research on Aspect Connectors for Software Architecture Adaptation Zhang, Jingjun; Li, Hui; Li, Furong; Software Engineering Workshop, 2007. SEW 2007. 31st IEEE Mar. 6, 2007-Feb. 8, 2007 pp. 63-66.*

(Continued)

*Primary Examiner*—David Jung
(74) *Attorney, Agent, or Firm*—Fitzpatrick, Cella, Harper & Scinto

(57) ABSTRACT

Obtaining exclusive control of a printing device by deferring printing of print data in a print queue. To obtain control, the recipient performs a process which may include authentication of the recipient. Control may be obtained either before the recipient is authenticated or after a successful authentication process. After the recipient has obtained control, print data in the print queue is temporarily deferred from being printed. The recipient may then select a print job to print, including selecting a print job from among the print jobs deferred in the print queue, or selecting a file to print over a network, including the Internet or an intranet. Further, printing device resources utilized in printing data during the period of exclusive control may be tracked and correlated to the recipient who has control.

125 Claims, 15 Drawing Sheets

U.S. PATENT DOCUMENTS

| | | | |
|---|---|---|---|
| 5,715,381 A | 2/1998 | Hamilton | 395/114 |
| 5,720,012 A | 2/1998 | McVeigh et al. | 395/113 |
| 5,740,497 A | 4/1998 | Yamada et al. | 399/87 |
| 5,752,697 A | 5/1998 | Mandel et al. | 271/288 |
| 5,771,103 A | 6/1998 | Ogino | 358/437 |
| 5,774,637 A | 6/1998 | Haber et al. | 395/114 |
| 5,799,206 A | 8/1998 | Kitagawa et al. | 395/856 |
| 5,804,803 A | 9/1998 | Cragun et al. | 235/375 |
| 5,812,907 A | 9/1998 | Itoh et al. | 399/87 |
| 5,819,015 A | 10/1998 | Martin et al. | 395/114 |
| 5,832,301 A | 11/1998 | Yamaguchi | 395/868 |
| 5,848,413 A | 12/1998 | Wolff | 707/10 |
| 5,901,286 A | 5/1999 | Danknick et al. | 395/200.33 |
| 5,903,646 A | 5/1999 | Rackman | 380/4 |
| 5,930,465 A | 7/1999 | Bellucco et al. | 395/114 |
| 5,933,498 A | 8/1999 | Schneck et al. | 380/4 |
| 5,933,501 A | 8/1999 | Leppek | 380/21 |
| 5,949,881 A | 9/1999 | Davis | 380/25 |
| 5,956,487 A | 9/1999 | Venkatraman et al. | 395/200.48 |
| 5,970,223 A | 10/1999 | Debes et al. | 395/115 |
| 6,058,277 A | 5/2000 | Streefkerk et al. | 399/81 |
| 6,145,031 A | 11/2000 | Mastie et al. | 710/52 |
| 6,184,996 B1 * | 2/2001 | Gase | 358/1.15 |
| 6,314,521 B1 | 11/2001 | Debry | 713/201 |
| 6,337,745 B1 * | 1/2002 | Aiello et al. | 358/1.15 |
| 6,343,361 B1 | 1/2002 | Nendell et al. | 713/171 |
| 6,378,070 B1 | 4/2002 | Chan et al. | 713/155 |
| 6,385,728 B1 | 5/2002 | DeBry | 713/201 |
| 6,430,690 B1 | 8/2002 | Vanstone et al. | 713/182 |
| 6,466,327 B2 | 10/2002 | Inaba et al. | 358/1.13 |
| 6,466,921 B1 | 10/2002 | Cordery et al. | 705/60 |
| 6,570,605 B1 | 5/2003 | Kashiwazaki | 347/264 |
| 6,581,092 B1 * | 6/2003 | Motoyama et al. | 709/219 |
| 6,757,741 B1 * | 6/2004 | Hertling | 709/245 |
| 6,775,729 B1 | 8/2004 | Matsuo et al. | 710/263 |
| 6,785,727 B1 | 8/2004 | Yamazaki | 709/229 |

FOREIGN PATENT DOCUMENTS

| | | |
|---|---|---|
| EP | 0 665 486 | 8/1995 |
| JP | 06-324822 | 11/1994 |
| JP | 09-034663 | 2/1997 |
| JP | 10-091373 | 4/1998 |
| JP | 2000-006499 | 1/2000 |
| JP | 2000-305725 | 11/2000 |

OTHER PUBLICATIONS

Design of a Security Management Middleware in Ubiquitous Computing Environments Zhefan Jiang; Kanghee x Kanghee Lee; Sangok Kim; Hyunchul Bae; Sangwook Kim; Soongju Kang; Parallel and Distributed Computing, Applications and Technologies, 2005. PDCAT 2005. Sixth International Conference on Dec. 5-8, 2005 pp. 306-308.*

Model-based design and analysis of permission-based security Jurjens, J.; Lehrhuber, M.; Wimmel, G.; Engineering of Complex Computer Systems, 2005. ICECCS 2005. Proceedings. 10th IEEE International Conference on Jun. 16-20, 2005 pp. 224-233.*

Dannenberg, Roger B., et al., "A Butler Process For Resource Sharing On Spice Machines", ACM Transactions On Office Information Systems, vol. 3, No. 3, pp. 234-252, Jul. 1985.

kinkon@t ftp, "Frequently Asked Questions about Kinko's FTP site", (visit d Jul. 7, 1999) <http://www.kinkos.com/kinkonet/ftporder_faq.html>.

U.S. Appl. No. 09/470,206, filed Dec. 22, 1999.

U.S. Appl. No. 09/411,665, filed Oct. 4, 1999.

* cited by examiner

OBTAINING TEMPORARY EXCLUSIVE CONTROL OF A PRINTING DEVICE

BACKGROUND OF THE INVENTION

1. Field of the Invention

The present invention concerns obtaining temporary exclusive control of printing devices. More particularly, the present invention relates to systems in which a recipient obtains control of a printer, either by being authenticated or in the absence of authentication. After the recipient gains control, the printer appears "busy" for other printer requests and the recipient can select print jobs to print, including selecting print jobs over a network.

2. Description of the Related Art

When printing print jobs to a printer, once the print jobs are printed out, a recipient must go to the printer in order to retrieve the hardcopy printout. Often, upon arriving at the printer to retrieve his printout, the recipient discovers that his hardcopy printout is not there. This may be because the recipient's print job is still pending in the print queue behind other print jobs, or because the print job may have been accidentally or intentionally taken by someone else. A similar problem arises with regard to facsimile transmissions. To address this problem, systems have been contemplated that defer printing a print job or a facsimile transmission until the recipient is present at the printer/facsimile.

One method of deferring printing of a facsimile transmission is known with regard to a Canon Laser Class 7000/7500 facsimile machine. This facsimile machine defers printing a transmission received by the facsimile machine by storing the transmission in a confidential electronic mailbox. The data is held in the mailbox until a person having the proper mailbox code arrives at the facsimile machine and enters the proper code to retrieve the data from the mailbox. Once the proper mailbox code has been entered, the transmission is printed by the facsimile machine.

One method of deferring printing in printers is to require recipient authentication in order for the print job to be printed. Co-pending U.S. patent application Ser. No. 09/411,665 entitled "Authenticated Secure Printing", filed Oct. 4, 1999, the contents of which are hereby incorporated by reference into the subject application as if set forth herein in full, describes a method of requiring recipient authentication in order to print secure documents. Briefly, the application describes a method where a user provides unique identification information that is submitted with a print job to a print node. Upon receiving the print job and unique identification information, the print node encrypts the print job and stores it in a secure manner. In order to retrieve the secure print job from the printer, a person having the proper authentication information provides this information to the printer, whereby the printer processes and prints out the print job.

Another method of deferring printing of a document until receiving recipient authentication has been described in U.S. Pat. No. 5,633,932 to Davis et al. According to the patent, a print job and a header are sent to a print node in encrypted format. If the document is considered to be "sensitive", then an indication that the document is sensitive is placed in an electronic header identifying the document as sensitive. Upon receiving the encrypted document and header, the print node decrypts the header to determine if the document is sensitive; if so, the document is stored until the print node receives authentication from the recipient. Thereafter, the "sensitive" document is printed.

The foregoing methods provide a way to defer printing until receiving authentication of the recipient. However, none of these methods addresses the further control of printing operations after the recipient has been authenticated. More particularly, in each of the foregoing methods, after the recipient has been authenticated, all print jobs pending in the print queue before the recipient's print job continue to print in the order they were received by the queue. Accordingly, the recipient has to wait until other print jobs pending before his are printed before his print job is printed. Moreover, the authenticated recipient is not able to select a print job to print from among those pending in the queue. Additionally, if the recipient submits a print job after he has been authenticated, he may have to be authenticated again in order for the newly submitted print jobs to print. Further, the recipient is only able to print print jobs that have been received by the queue and is not able to manually access a remote storage location and download a print job to print.

Additional concerns arise with regard to accurate accounting of resources used in printing operations, such as the amount and type of paper used and the amount of ink used. In more detail, accurate accounting of resources may be desired in order to bill a particular department within an office or a particular person using the resources. Accounting is most commonly accomplished by software in a print server that tracks print jobs based on who submitted the print job. However, this accounting method does not accurately reflect the actual recipient who is using the resources, but only identifies the sender or sending department. This becomes particularly apparent where one department such as an accounting department, requests that another department such as an engineering department, send it a copy of a document. In this case, the sender (engineering) would be billed for resources whereas the recipient (accounting) is actually using the resources. As a result, the sender is billed for resources that they are not using.

SUMMARY OF THE INVENTION

The present invention addresses the foregoing by providing a system in which a recipient obtains exclusive control of a printer. While the recipient has exclusive control, print jobs that have been or that are subsequently submitted to a print queue of the printer are deferred. Meanwhile, the recipient accesses print data that he wants to print and submits it to the printer for printing, whereby the print data is printed ahead of the print jobs in the print queue.

According to one aspect of the invention, the recipient obtains control of the printer by being authenticated. Once the recipient is authenticated, all authenticated print jobs that are intended for the recipient are printed, or alternatively, the recipient may select which print jobs to print. Print jobs intended for the recipient are those for which the recipient's authentication is required. Meanwhile, printing of other print jobs are deferred.

Thus, in one aspect the invention allows exclusive control of a printing device to be obtained by a recipient to print data that requires authentication of the recipient. According to the invention, the recipient is authenticated and then provided exclusive control of the printing device's print capabilities. After the recipient has been authenticated, print data not intended for the recipient is temporarily deferred while print data intended for the recipient is printed during a period in which the recipient has exclusive control of the printing device's print capabilities.

As a result of the foregoing arrangement, once the recipient has been authenticated, print jobs intended for the recipient are printed out before other print jobs. Meanwhile, all print jobs that are not intended for the recipient are deferred from being printed until the recipient's print jobs have completed printing and the recipient relinquishes control of the printing device's print capabilities. For instance, once the recipient presents his authentication information and is authenticated, the printer appears busy to all other print jobs until the recipient's print jobs have completed printing and the recipient has relinquished control of the printer. Accordingly, the recipient can print his print jobs before others without waiting for the others to print first.

The invention is not limited to being utilized in conjunction with printers. Rather, the invention may also be utilized in conjunction with any image forming device including facsimiles and copiers.

Additionally, the invention provides for selection of which print jobs to print from among a list of print jobs. In this regard, the recipient can select those print jobs that he wants to print and defer printing of the rest of his print jobs until a later time. For instance, if the recipient has several authenticated print jobs pending in the queue and he needs to have one of the print jobs printed immediately (perhaps because he is in a rush to attend a meeting), he can select the one print job from a list and have it printed and can then return at a later time to retrieve the remainder of the authenticated print jobs.

Further, the invention provides for print by reference in which print data is stored in a remote location rather than in the queue, with a reference to the print data storage location being submitted to the queue. This provides for printing data from any remote location, without unnecessarily filling the queue with large amounts of data.

The invention also provides for printing over the Internet or an intranet using an interface provided in the printing device. Once the recipient has obtained exclusive control of the printing device's print capabilities, the recipient may access print data from a remote network location, including the Internet or intranet location, and can print it out on the printing device.

Further, the invention may track printing resources utilized by an authenticated recipient in printing data while the recipient has exclusive control of the printing device's print capabilities and correlates the tracked resources to the recipient. Tracking the resources provides a way to account for the resources used by the recipient, such as the type and amount of paper used or the amount of ink used.

In another aspect, the invention is printing images on a printing device by obtaining control over printing operations of the printing device, and performing a process to access print data to print out an image by the printing device during a period of control over the printing device. Obtaining control may include deferring of all print jobs submitted to a print queue for printing by the printing device, control over all communication interfaces of the printing device, control over network access to the printing device, or control over print engine operations of the printing device. Further, obtaining control may include authenticating a recipient, where the recipient obtains control either before or after the recipient is authenticated. The process to print out an image may include accessing print data over a network to be printed by the printing device, where the network may be the Internet or an intranet, accessing at least one print job in a print queue, or performing a copying operation or a facsimile operation.

In a further aspect, the invention is controlling printing operations of a printing device by obtaining control over the printing operations of the printing device, and maintaining control over the printing operations until control is manually relinquished by a recipient who has obtained control. Obtaining control may include deferring of all print jobs submitted to a print queue for printing by the printing device, control over all communication interfaces of the printing device, control over network access to the printing device, or control over print engine operations of the printing device. Obtaining control may also include authenticating a recipient, where the recipient obtains control either before or after the recipient is authenticated. The recipient may perform a process to print out an image by the printing device while control is maintained over the printing device. The process may include accessing print data over a network to be printed by the printing device, where the network may be the Internet or an intranet, accessing at least one print job in a print queue of the printing device, or performing a copying operation or a facsimile operation. Additionally, printing device resources utilized during the printing process may be tracked and the tracked resources correlated to an authenticated recipient.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
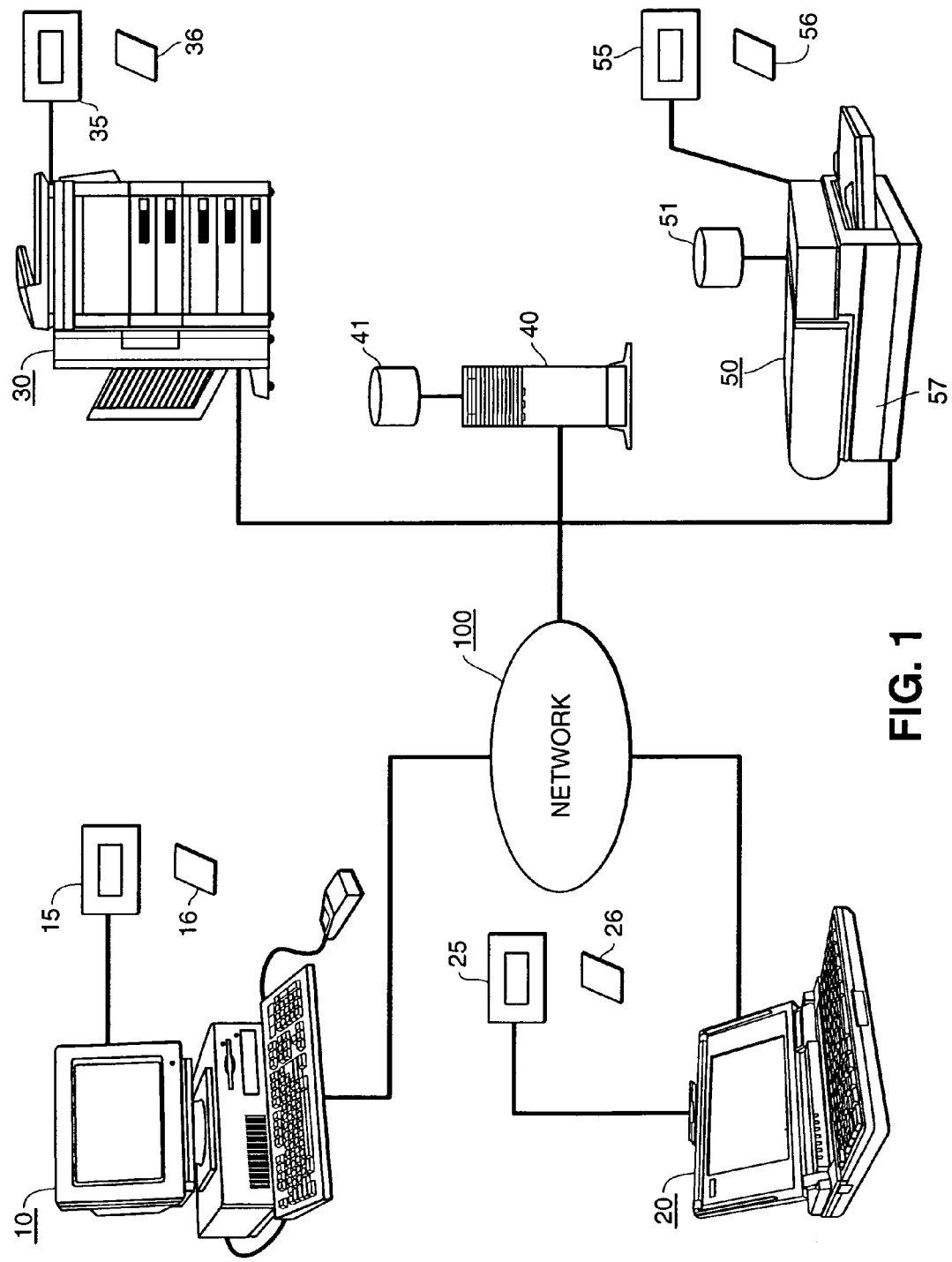
FIG. 1 is a representative view of a networked computing environment in which the present invention may be implemented.

FIG. 1 provides an overall system view of a networked computing environment in which the present invention may be implemented. Although the following description focuses primarily on the networked computing environment shown in FIG. 1, the present invention may be implemented in various alternative systems. For example, the present invention may be implemented in any arrangement including those shown in FIGS. 5 and 13 to 15.

As shown in FIG. 1, the networked computing environment comprises a network 100 which is connected to desktop computer 10, laptop computer 20, server 40, digital copier 30 and printer 50. Network 100 is preferably an Ethernet network medium consisting of a bus-type physical architecture, although the invention can be utilized over other types of networks, including the Internet or an intranet.

Desktop computer 10 may be an IBM PC-compatible computer having a windowing environment such as Microsoft Windows 95, Windows 98 or Windows NT, a Macintosh workstation, a UNIX workstation, a Sun Microsystems workstation, or virtually any workstation from which print jobs may be submitted for printing. For the purposes of brevity, only an IBM PC-compatible workstation will be described herein. As is typical with IBM PC-compatible computers, desktop computer 10 preferably has a display, keyboard, mouse, floppy drive and/or other type of storage medium (not shown). Also attached to desktop computer 10 is smart card interface device 15 for interfacing with a smart card of a computer user, such as smart card 16. Smart card 16 therefore provides a mechanism whereby a computer user can authenticate the user's identity to desktop computer 10, printer 50 or digital copier 30. Although the use of smart card interface device 15 and smart card 16 are described herein, other mechanisms such as a hardware token and token reader may also be used.

Similar to desktop computer 10, laptop computer 20 also may be any type of laptop from which print jobs may be submitted for printing. However, for brevity, only an IBM PC-compatible computer having a windowing environment such as Microsoft Windows 95, Windows 98 or Windows NT will be discussed herein. Like desktop computer 10, laptop computer 20 also has a display, keyboard, mouse and floppy drive or other storage means (not shown). In addition, laptop computer 20 also has a smart card interface device 25 attached to it for interfacing to the smart card of a computer user such as smart card 26.

Also attached to network 100 are digital copier 30 and printer 50 which are capable of receiving image data over network 100 for printing. Digital copier 30 also has attached smart card interface device 35 for interfacing with the smart card of a print job recipient, such as smart card 36. Printer 50 likewise has smart card interface 55 for interfacing with smart card 56.

Additionally, server 40 is connected to network 100. Server 40 may be any type of computer that functions as a server such as a Compaq Prosignia 1600 server. Also, server 40 may utilize any network operating system such as Novell Netware, Windows NT, DOS, Windows 95/98 or UNIX. The present invention is not limited to any particular server type or operating system and may be implemented with any server and operating system in which print jobs are printed over a network. Server 40 has a storage device 41 which is preferably a large fixed disk for storing numerous application document files, print data files or other data files. Additionally, server 40 preferably contains a print queue within the fixed disk for storing and managing print data processed through server 40. Server 40 can be utilized by other devices on network 100 as a file server and may also act as a gateway for other devices on network 100 to another network such as the Internet.

Printer 50 may be any type of printing device from which images may be printed. For example, printer 50 may be a laser or bubble-jet printer which is capable of operating as both a printer and a facsimile device. Printer 50 may have a storage device 51 that is preferably a large fixed disk. Storage device 51 may be utilized for storing print data received by printer 50. However, as will become apparent from the discussion below, a print queue and print data storage device is preferably provided in server 40. Printer 50 also has an embedded smart-chip 57 which performs various functions related to encryption/decryption (if necessary) and authentication of a recipient. In addition, printer 50 is connected to smart card interface device 55 which is capable of interfacing with a smart card of a print job recipient, such as smart card 56. In this manner, the printing of a print job that requires authentication of the recipient may be controlled through the use of smart card interface device 55 and smart card 56, in combination with smart-chip 57 in printer 50.

Figure 2:
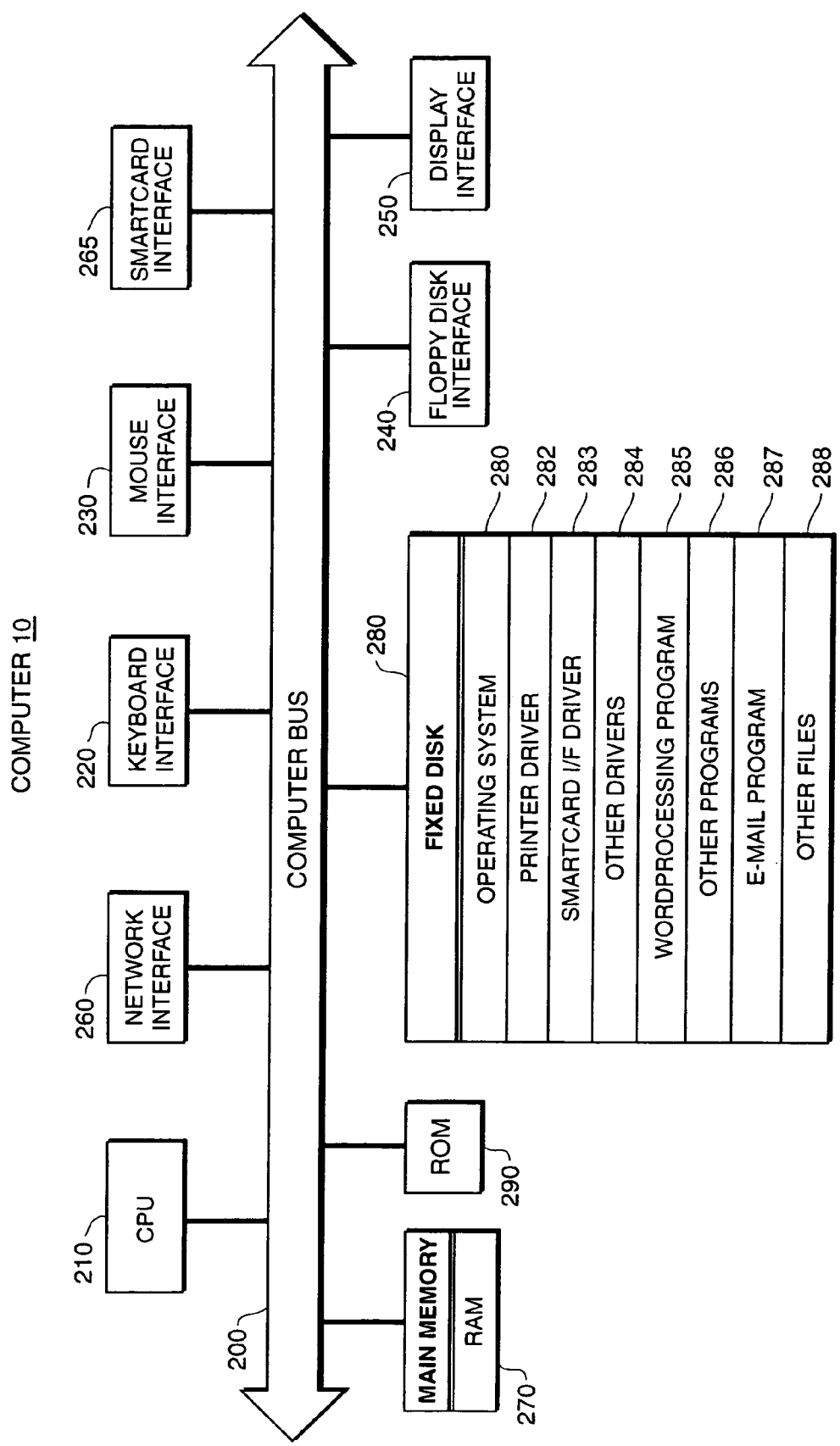
FIG. 2 is a detailed block diagram showing the internal architecture of the computer of FIG. 1.

FIG. 2 is a block diagram showing an overview of the internal architecture of desktop computer 10. In FIG. 2, desktop computer 10 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a pointing device, floppy disk interface 240 for interfacing to a floppy disk, display interface 250 for interfacing to a display, network interface 260 for interfacing to network 100, and smart card interface 265 for interfacing to smart card interface device 15.

Random access memory (RAM) 270 interfaces to computer bus 200 to provide CPU 210 with access to memory storage, thereby acting as the main run-time memory for CPU 210. In particular, when executing stored program instruction sequences, CPU 210 loads those instruction sequences from fixed disk 280 (or other memory media) into RAM 270 and executes those stored program instruction sequences out of RAM 270. It should also be noted that standard-disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices attached to computer 10.

Fixed disk 280 is one example of a computer-readable medium that stores program instruction sequences executable by CPU 210 so as to constitute operating system 281, printer driver 282, smart card interface driver 283, other drivers 284, word processing program 285, other programs 286, e-mail program 287 and other files 288. As mentioned above, operating system 281 is preferably a windowing operating system, although other types of operating systems may be used with the present invention. Printer driver 282 is utilized to prepare image data for printing on at least one image forming device, such as printer 50. Smart card interface driver 283 is utilized to drive and control smart card interface 265 for interfacing with smart card interface device 15 so as to read and write to a smart card such as smart card 16. Other drivers 284 include drivers for each of the remaining interfaces which are coupled to computer bus 200.

Word processing program 285 is a typical word processor program for creating documents and images, such as Microsoft Word, or Corel WordPerfect documents. Other programs 286 contains other programs necessary to operate desktop computer 10 and to run desired applications. E-mail program 287 is a typical e-mail program that allows desktop computer 10 to receive and send e-mails over network 100. Other files 288 include any of the files necessary for the operation of desktop computer 10 or files created and/or maintained by other application programs on desktop computer 10. For example, Internet browser application programs, such as Microsoft Internet Explorer or Netscape Navigator, may be included in other files 288.

Figure 3:
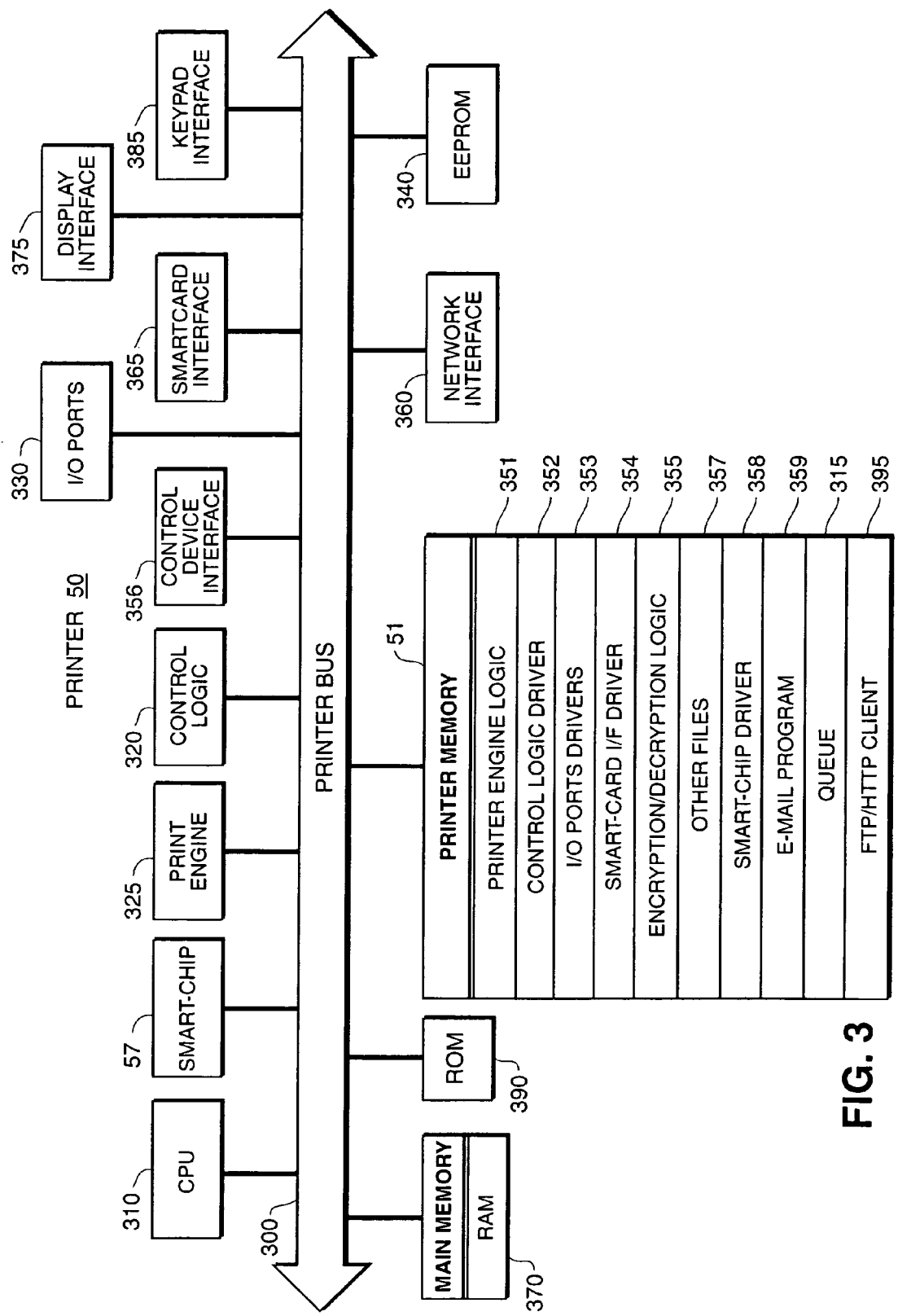
FIG. 3 is a detailed block diagram of the internal architecture of the printer of FIG. 1.

FIG. 3 is a block diagram showing an overview of the internal architecture of printer 50. In FIG. 3, printer 50 is seen to contain a printer smart-chip 57 which may be utilized in conjunction with smart-chip driver 358 for performing an authentication process of a recipient. Printer 50 also contains a central processing unit (CPU) 310 such as a programmable microprocessor which is interfaced to printer bus 300. Also coupled to printer bus 300 are control logic 320, which is utilized to control printer engine 325 of printer 50, I/O ports 330 which is used to communicate with various input/output devices of printer 50 (not shown), smart card interface 365 which is utilized to interface with smart card interface device 55, network interface 360 which is utilized to interface printer 50 to network 100, and control device interface 356 which is utilized to interface with a device for obtaining control of the printer operations.

Control device interface 356 may interface with virtually any type of mechanism that a user may activate to obtain control of the printer. For instance, control device interface 356 may interface with a button on a control panel of printer 50, whereby the user pushes the button to gain control over the printer. When the button is pressed, an indication of such is provided to print engine control logic 351, whereby the user gains control over the print engine operations. Of course, other devices could be used to gain control over the printer including a user entering a username (identification) at a control panel of printer 50, or by an authentication device beginning or completing an authentication process. As will be described in more detail below, the authentication process may be any of a number of processes, including but not limited to entering a username and password, insertion of a smart card or hardware token into a reader, a wireless token (such as a speedway pass), or turning of a key.

Control device interface 356 also interfaces with mechanisms for relinquishing control of the printer. For example, a control panel of printer 50 may include one button for obtaining control, and a different button for relinquishing control of the printer. In a similar manner as described above, when a device for relinquishing control of the printer is activated, regardless of the type of device, control device interface 356 supplies an indication that the relinquishing device has been activated to print engine control logic 351, whereby the user relinquishes control over the print engine operations and normal printing operations resume.

Also coupled to printer bus 300 are EEPROM 340, for containing non-volatile program instructions, random access memory (RAM) 370, printer memory 51 and read-only memory (ROM) 390. RAM 370 interfaces to printer bus 300 to provide CPU 310 with access to memory storage, thereby acting as the main run-time memory for CPU 310. In particular, when executing stored program instruction sequences, CPU 310 loads those instruction sequences from printer memory 51 (or other memory media) into RAM 370 and executes those stored program instruction sequences out of RAM 370. ROM 390 stores invariant instruction sequences, such as start-up instruction sequences for CPU 310 or BIOS sequences for the operation of various peripheral devices of printer 50 (not shown).

Printer memory 51 is one example of a computer-readable medium that stores program instruction sequences executable by CPU 310 so as to constitute printer engine logic 351, control logic driver 352, I/O port drivers 353, smart card interface driver 354, other files 357, printer smart-chip driver 358, and e-mail program 359. Printer engine logic 351 and control logic driver 352 are utilized to control and drive the printer engine 325 of printer 50 so as to print an image according to image data received by printer 50, preferably over network 100. I/O port drivers 353 are utilized to drive the input and output devices (not shown) connected through I/O ports 330. Smart card interface driver 354 is utilized to drive smart card interface 365 for interfacing to smart card interface device 55, thereby enabling printer 50 to communicate with a smart card such as smart card 56 during the process of authenticating a recipient.

Other files 357 contain other files and/or programs for the operation of printer 50. Printer smart-chip driver 358 is utilized to interface with printer smart-chip 57 for certain cryptographic operations. E-mail program 359 is a typical e-mail program for enabling printer 50 to receive e-mail messages from network 100. Such e-mail messages may contain print job-related information, as discussed in more detail below. Printer memory 51 also includes FTP/HTTP client 395 which provide the ability to retrieve files over the network through network interface 360. Also connected to printer bus 300 are display interface 375 and keypad interface 385. As will be described below, printer 50 may include a display and keypad that provides a recipient with an option to retrieve a print job from a remote storage location utilizing, for example, FTP/HTTP client 395.

Figure 4:
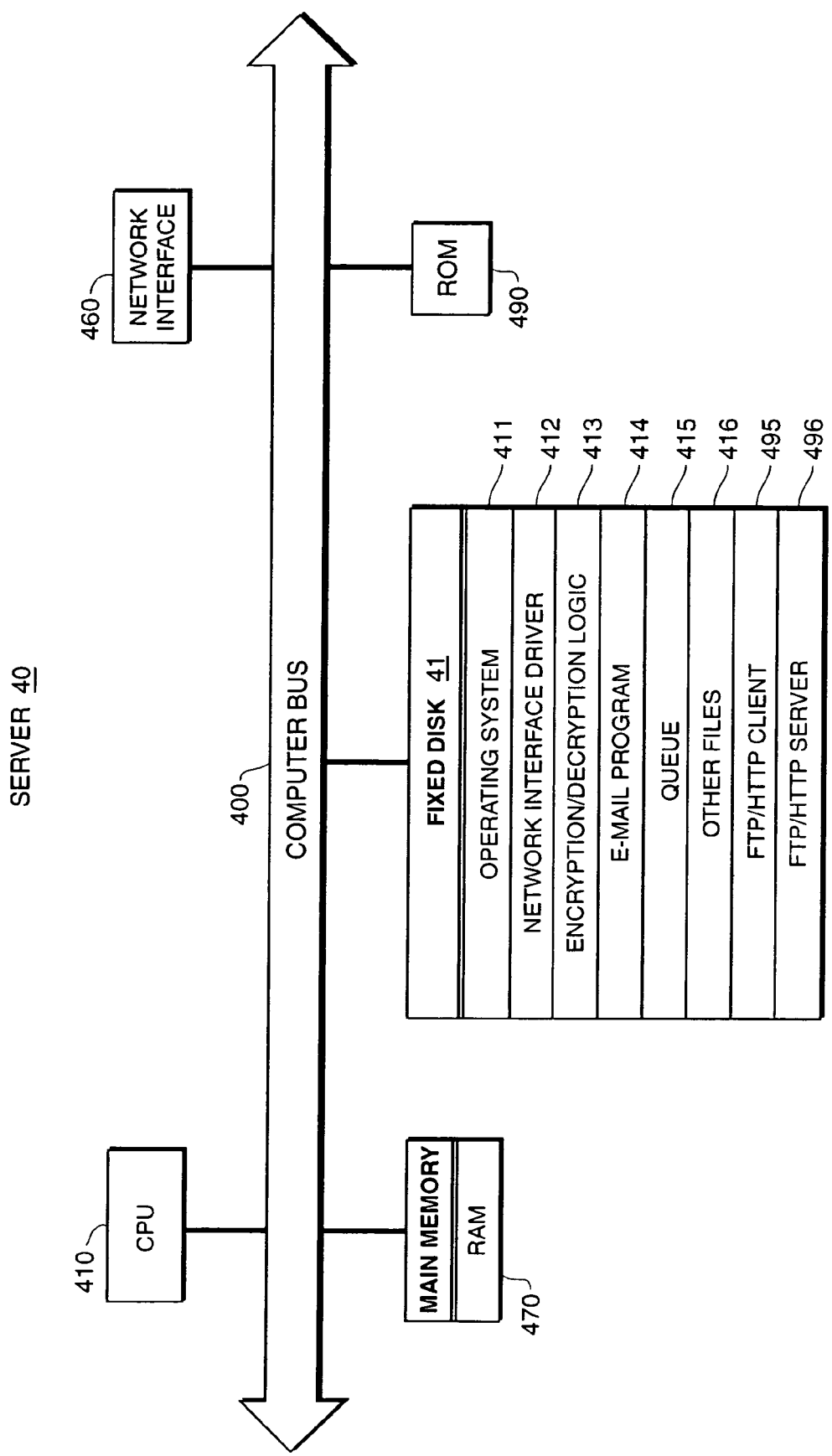
FIG. 4 is a detailed block diagram of the internal architecture of the server of FIG. 1.

FIG. 4 is a block diagram showing an overview of the internal architecture of server 40. In FIG. 4, server 40 is seen to include a central processing unit (CPU) 410 such as a programmable microprocessor which is interfaced to computer bus 400. Also coupled to computer bus 400 is a network interface 460 for interfacing to network 100. In addition, random access memory (RAM) 470, fixed disk 41, and read-only (ROM) 490 are also coupled to computer bus 400. RAM 470 interfaces to computer bus 400 to provide CPU 410 with access to memory storage, thereby acting as the main run-time memory for CPU 410. In particular, when executing stored program instruction sequences, CPU 410 loads those instruction sequences from fixed disk 41 (or other memory media) into RAM 470 and executes those stored program instruction sequences out of RAM 470. It should also be recognized that standard disk-swapping techniques allow segments of memory to be swapped to and from RAM 470 and fixed disk 41. ROM 490 stores invariant instruction sequences, such as start-up instruction sequences for CPU 410 or basic input/output operating system (BIOS) sequences for the operation of peripheral devices which may be attached to server 40 (not shown).

Fixed disk 41 is one example of a computer-readable medium that stores program instruction sequences executable by CPU 410 so as to constitute operating system 411, network interface driver 412, encryption/decryption logic 413, e-mail program 414, queue 415, FTP/HTTP client 495, FTP/HTTP server 496 and other files 416. As mentioned above, operating system 411 can be an operating system such as DOS, Windows 95, Windows 98, Windows NT, UNIX, Novell Netware or other such operating system. Network interface driver 412 is utilized to drive network interface 460 for interfacing server 40 to network 100. E-mail program 414 is a typical e-mail program and enables server 40 to receive and/or send e-mail messages over network 100. Queue 415 is utilized to store numerous print jobs for output on one or more image forming devices, such as printer 50. Other files 416 contains other files or programs necessary to operate server 40 and/or to provide additional functionality to server 40. FTP/HTTP client 495 provides server 40 with the ability to retrieve data files via FTP and HTTP protocols over the network through network interface 460. Additionally, FTP/HTTP server 496 of server 40 can be accessed by FTP/HTTP client 395 of printer 50 or an FTP/HTTP client in a workstation such as computer 10.

Obtaining temporary exclusive control of a printing device will now be described in more detail. However, a brief description of what is meant by obtaining temporary exclusive control, how exclusive control can be obtained, relinquishing exclusive control, what a user can do while he has exclusive control, and some of the terms used in the following discussion will be presented first. Obtaining exclusive control generally refers to blocking access to the printing device and gaining control of the print engine operations of the printing device. Blocking access means control over network access to the printing device, control over all other communication interfaces of the printing device and printing of printer status pages or other administrative operations. For instance, control over network access may be control over access to print jobs, or, if the printing device is a multi-function device, control over incoming jobs such as incoming facsimiles. Control over the communication interfaces may be control over communication channels such as parallel and serial ports, USB (Universal Serial Bus) ports, infrared devices, RF devices, etc.

Additionally, control may be obtained either in conjunction with an authentication process or without regard to an authentication process. In a case where control is obtained in conjunction with an authentication process, control may be obtained either at the beginning of the authentication process or after the authentication process has completed. In the former case where control is obtained at the beginning of the authentication process, control is relinquished if the authentication process fails. On the other hand, in the latter case, control is not obtained until a successful authentication process has been completed.

There are numerous authentication processes that could be performed, some of which are described in more detail below. Briefly, the authentication processes may include entering a username and password, insertion of a smart card or hardware token into a reader, reading of a wireless token (such as a speedway pass), turning of a key, or biometrics. Of course, the invention is not limited to any particular authentication process and the invention may be employed with any type of authentication process, including those listed above.

Control may also be obtained without an authentication process. For example, a user may enter a username on a keypad at the printer, thereby gaining control. This process does not necessarily perform an authentication process, but rather merely identifies the user and provides him with control over the printer upon entering his username. Additionally, the printer may be provided with a button for gaining control. In this manner, a user who wants to gain control over the printer merely presses the button and is provided control over the printer. As can readily be seen, this type of device for gaining control has no correlation to the user and therefore any user could obtain control in this manner. The invention is not limited to these methods of gaining control and virtually any device that provides the ability to gain control over the printer could be used.

After the user gains control of the printer, the printer generally only returns to normal printing operations when the user relinquishes control. Similar to the process of gaining control, there are numerous ways in which a user could relinquish control and the invention is not limited to any one particular way. Some examples of ways to relinquish control may be pressing a button on a control panel of the printer, a user activity timeout, completion of pending print operations and a user activity timeout, removal of a smart card or hardware token from the reader, or removal of a smart card or hardware token from the reader in conjunction with completion of pending print operations, a user activity timeout and a token timeout. Additionally, an authentication/authorization failure could be utilized to relinquish control.

While the user has exclusive control over the printer operations, there are various operations that can be performed. For instance, if the printer is a multi-function device such as a printer/facsimile or a printer/copier, the user can perform facsimile operations to send a facsimile or to print out a facsimile message stored in an electronic mailbox, or they may perform copying operations to produce photocopies. Additionally, the user may browse a network for files to print in the printer. For instance, the user could browse a network for files stored in a file server or an e-mail server. Additionally, the user could utilize a URL (Universal Resource Locator) to retrieve a file from the Internet or an intranet location and have it printed on the printer. Further, the user could access a listing of print jobs contained in a print queue of the printer. The listing could be provided to display all print jobs, only print jobs belonging to the user, or only authenticated print jobs belonging to the user (if the user is authenticated). Therefore, the user could select a print job from the queue to print. As can readily be seen, there are numerous operations that can be performed by the user once he has exclusive control over the printer. The foregoing are merely some examples of operations that could be performed and the invention is not limited to these, but may include other operations as well.

Regarding some of the terms used in the following discussion, the term "sender" refers to the person who submits a print job from a host computer, or sending node, to be printed out by an image forming device. The "intended recipient" refers to the person holding the proper credentials with which he can authenticate himself at the image forming device. In some cases, the sender and the intended recipient may be one in the same. That is, the person who sends the print job may also hold the proper credentials to authenticate himself at the image forming device. In other cases, the sender and the intended recipient may be different individuals. For example, the sender may submit a print job that is to be retrieved by someone other than himself who holds the proper credentials to be authenticated at the image forming device. However, in the examples described below, the "intended recipient" refers to the person holding the proper credentials with which he can authenticate himself at the image forming device, regardless of who submitted the print job.

The term "sending node" refers to an entity that submits print jobs to a printer. This may include, but is not limited to, a personal computer or an intermediate server other than a print server. A print job may be submitted directly from a sending node to a print server or to a printer itself.

A "print queue" refers to a software and hardware mechanism for storing print jobs. The mechanism may include, but is not limited to, buffers in RAM, RAM disks, hard disks, and flash disks. The print queue may be located in any one of several locations, including a personal computer that submits the print jobs (sending node), a network printer itself, a stand alone print server, or a personal computer acting as a print server. The print queue is a temporary storage location for print jobs before they are submitted to the printer for printing.

A "print server" refers to a software mechanism to receive print jobs and send them to a printer for printing. The print server may be a stand alone print server such as a Novell P-server, may be contained within a network printer itself, or may be contained within another personal computer. In a case where the print server is contained within another personal computer, the print server in the personal computer may accept print jobs from another sending personal computer and then submit them to a print server located within a networked printer.

A "printing device" refers to an entity that processes the print jobs and prints out an image onto a recording medium. Examples of printing devices include bubble-jet printers, laser printers, facsimile machines, and network copier/printer machines. It should be noted that the present invention may be utilized in any image forming device, including but not limited to the foregoing image forming devices.

"Accounting software" refers to a computer program that performs accounting tasks for network printing. Such a program may be provided in a centralized accounting server that retrieves usage information from all printers in the network. The program could also reside on a print server, within a personal computer acting as a print server, or virtually any other device that is capable of collecting print job usage information from print jobs printed out by printers in the network.

In the following discussion, the term "normal print job" means a print job that does not contain any special electronic header information or other information identifying any particular recipient with the print job and that does not require authentication of the recipient in order to be printed. Normal print jobs are generally processed by the print server to be printed out in turn, i.e. after other print jobs already received by the printer. They do not require recipient authentication in order to be printed and therefore are not held off from being printed until a recipient presents the proper authentication information.

The term "authenticated print job" means a print job that can only be printed out after the intended recipient has been authenticated. That is, an authenticated print job contains unique identification information of the intended recipient and is held off from being printed until the recipient has been authenticated at the printer. Once the recipient has been authenticated, the authenticated print job is released for printing.

Figure 5:
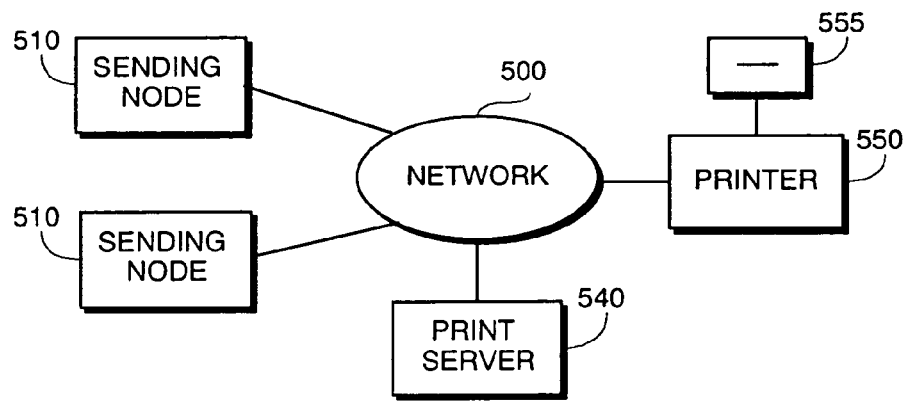
FIG. 5 depicts one system arrangement in which the invention may be employed.

FIG. 5 depicts one system arrangement in which the present invention may be employed. The invention is not limited to being employed in the system of FIG. 5 and as will be described below, may be employed in numerous other systems. As shown in FIG. 5, one or more sending nodes 510 such as computer 10, a print server 540 such as server 40, and at least one printing device 550 such as printer 50, communicate via a network 500. In this regard, network 500 may be any type of network, including a local area network (LAN), a wide area network (WAN), the Internet, an intranet or any other type of network. A hard-wired network connection is not necessarily required and the present invention may be employed where the computer and printer communicate via a wireless connection. Also attached to printer 550 is smart card interface device 555.

In the present system shown in FIG. 5, a print queue is external to printer 550 and is preferably included within server 540. A case where the print queue is included within the printer itself rather than being external to the printer will be described in more detail below with regard to FIG. 14.

As stated above, exclusive control can be obtained either in conjunction with authentication or without regard to authentication. In the following discussion, exclusive control in conjunction with authentication will be discussed first and then a discussion of exclusive control without regard to authentication will be provided.

FIGS. 6A, 6B, 6C and 6D are flowcharts depicting process steps for obtaining control of a printing device in conjunction with authentication where control is obtained after a successful authentication process. Briefly, the process steps comprise print data being submitted from a sending node to a print queue, determining whether the print job is an authenticated print job and if so, deferring printing until the intended recipient is authenticated, authenticating the intended recipient, deferring printing of print jobs in the print queue, the authenticated recipient selecting print jobs to be printed out, the authenticated recipient relinquishing control and the printing device resuming normal printing operations.

Figure 6A:
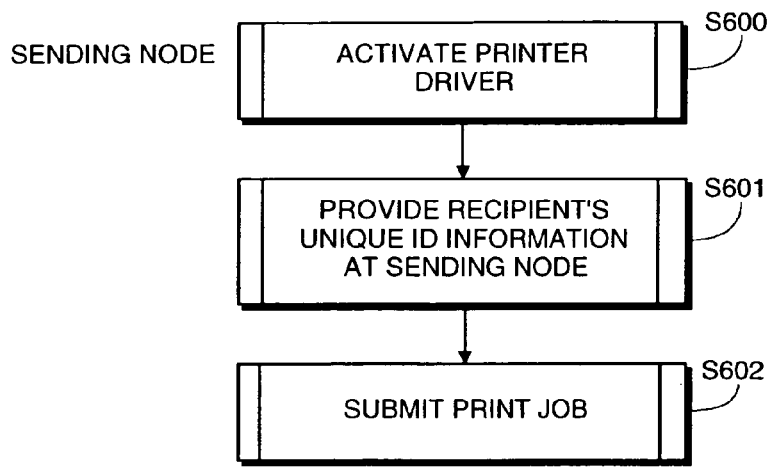
FIG. 6A is a flowchart depicting process steps for submitting a print job for printing.

As shown in FIG. 6A, in step S600, in order to submit a print job, a user activates a print driver at a sending node such as desktop computer 10 or laptop computer 20. For example, if the sender is utilizing a word processor application program, such as Microsoft Word or Corel WordPerfect, and wants to print the document, he would normally select a print option within the application program, thereby activating a print driver. The print driver usually permits the sender to select printing options, such as printing speed, print resolution, or number of copies. For the present invention, one option would be to select an authenticated printing mode. In this regard, if the sender wants the print job to only be printed out after the recipient has been authenticated at the printer, the sender would select this mode. Of course the invention is not limited to selection of an authenticated print mode in a print driver and other processes for submitting authenticated print jobs may be utilized instead. For instance, if the print driver has the ability to automatically detect that a smart card is inserted in the smart card reader, the print driver may automatically obtain the recipient's identification information from the smart card and submit the print job as an authenticated print job, without the need for a user to select an authenticated print mode in the print driver. As such, any method for submitting an authenticated print job could be utilized.

In FIG. 6A, if the print job is an authenticated print job, print data is submitted along with user identification information (step S601). The user identification information may be a distinguished name contained in a digital certificate, a user/personal identification number, biometric information, or any other information that uniquely identifies the intended recipient. The identification information links the print job to the intended recipient so that only the intended recipient is able to print the print job. More specifically, identification information (such as the intended recipient's first name, last name, country, locality (city), organization, organization unit, or other information that is unique to him) is linked to the print job. The actual identification information linked to the print job is implementation dependent. It could simply be a user ID number or perhaps an entire digital certificate. Of course, the sender would not have biometric information of the recipient since such information requires the recipient to be present at the sending node and to supply such information himself. However, after the sender submits the print job utilizing the recipient's distinguished name or digital certificate, the recipient may be authenticated at the image forming device by a biometric device. Therefore, there may be a distinction between the types of devices utilized in linking the recipient's information to the print job for submitting the authenticated print job and the types of devices utilized in authenticating the recipient.

The recipient's information may be obtained and linked to the print job by various methods. For example, the sender could insert a smart card into a smart card reader located at the sending node, such as smart card reader 15 connected to computer 10 as seen in FIG. 1. The smart card contains the intended recipient's unique identification information in digital form which is supplied to the computer through smart card interface 265. Alternatively, the information may be obtained from a digital certificate via a Public Key Infrastructure, by e-mail or some other device. In this case, the information could be downloaded to computer 10 over the Internet to be subsequently submitted with the print job.

Further, biometric identifying information such as fingerprints or retinal scans of the recipient could be utilized such that a biometric device at the printer could be used to authenticate the recipient. Therefore, any device that provides unique identification information about the recipient to the sending node and subsequently performs authentication of the recipient could be used.

Of course, authenticated print jobs are not the only type of print jobs that can be submitted by the sending node and the invention is not limited to use with authenticated print jobs. The sender could select a normal print job mode from the printer driver wherein a normal print job not requiring authentication of the recipient would be submitted. Thus, in the present example, step S601 would be omitted.

Referring again to FIG. 6A, once the identification information has been provided in step S601, the authenticated print job is submitted for printing from the sending node (step S602). In FIG. 5, the authenticated print job is submitted to a print queue contained within server 540. However, as previously stated, the print job is not required to be submitted to a print queue in a server and may be submitted to a print queue within the sending node itself, across a network to an intermediate server or to a print server contained within a printer itself.

Figure 6B:
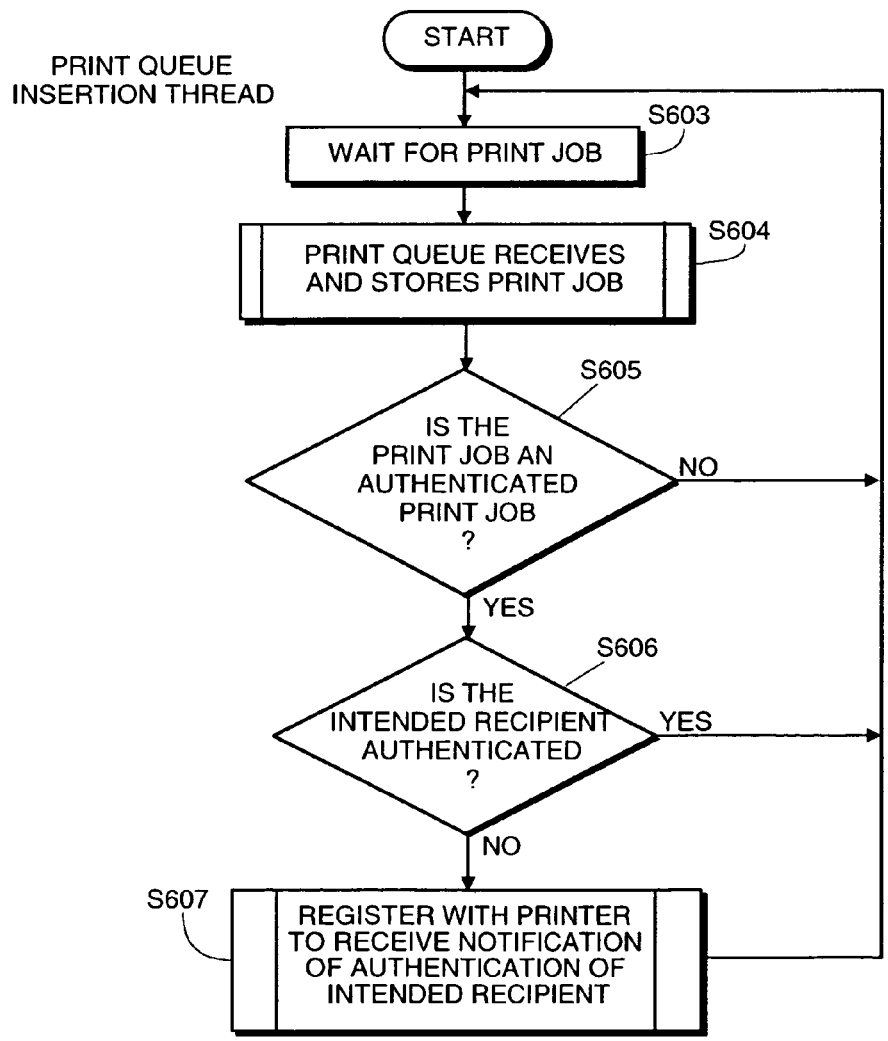
FIG. 6B is a flowchart depicting process steps for a print queue insertion thread.

FIG. 6B depicts process steps of a print queue insertion thread. In FIG. 6B, after the authenticated print job has been submitted by the sending node, the print queue insertion thread unblocks from waiting for a print job (step S603) in order to receive and store the print job (step S604). A determination is then made whether the received print job is an authenticated print job (step S605). If the print job is not an authenticated print job, control returns to step S603 and this thread waits to receive another print job. Note that a separate print queue extraction thread is responsible for removing print jobs from the queue and sending them to the printer to be printed (depicted in FIG. 6E).

In most cases, upon receiving the print data from the print queue, the printer buffers the data in memory and begins processing the data to print out an image. However, in some printers, once the print data is submitted from the queue to the printer, the printer may temporarily store the data in a local disk within the printer rather than buffering the print data in memory. In these printers, once sufficient data has been stored on the disk, the printer may begin buffering the data from the local disk into the printer's memory and then begin printing while the remainder of the data continues to be stored to the disk. Of course, the printer may also wait for the entire print job to be stored in the local disk before data begins buffering rather than beginning to buffer data once sufficient data has been stored on the disk.

Returning to step S605, if the print job is an authenticated print job, then a determination is made whether or not the recipient has been authenticated (step S606). This determination may comprise the print queue performing a polling operation to poll the printer for the recipient's identification information. If the recipient has been authenticated, then the printer would respond to the queue with the recipient's identification information. If the recipient has not been authenticated, the printer may either provide a negative response or no response at all. If the recipient is not yet authenticated, then flow proceeds to step S607 where the print queue registers with the printer to receive a notification when the recipient is authenticated. Thus, the print job is deferred from printing until the recipient holding the proper authentication information presents the authentication information at the printer. The print data may be stored in the print queue or in a print server.

There are various methods in which an authenticated print job may be deferred from being printed until the recipient is authenticated. One method is for the print queue to attempt to establish communication with the printer in order to submit the print data to it for printing. Upon attempting to establish communication, the print queue may request the recipient's authentication information. If the printer has not received authentication information from the recipient, i.e. the recipient has not yet been authenticated at the printer, then the print queue may register with the printer for the printer to notify it when the recipient has been authenticated. In the present example, since the recipient has not yet been authenticated, the printer fails to return the necessary authentication information and the print queue registers with the printer and waits to send the print job data to the printer after receiving notification (step S607).

Another method of deferring printing of an authenticated print job may be accomplished by using a polling mechanism. Several network protocols utilize a request/response routine. In this regard, once the queue receives an authenticated print job, the protocol requests the recipient's authentication information from the printer. If the recipient has not arrived at the printer and has not presented the authentication information to the printer, then the printer returns a negative response or no response at all and the print job is deferred from being printed. Repeated requests are preformed over set time intervals by the protocol, each receiving a negative response or no response until the recipient presents the authentication information to the printer. Once the recipient has been authenticated, the protocol receives the required information and then submits the print data to the printer for printing.

The invention will now be described in more detail by way of several examples. A first example will discuss a printer receiving both normal and authenticated print jobs where the recipient has not yet been authenticated. A second example will discuss a case where only authenticated print jobs are in the queue, a recipient is authenticated and opts to print all of his authenticated print jobs and promptly relinquishes control. A third example will discuss a case where both normal and authenticated print jobs are in the queue, a recipient is authenticated and opts to select all of his authenticated print jobs and promptly relinquishes control. A fourth example will discuss a case where both normal and authenticated print jobs are in the queue, a recipient is authenticated and maintains control. The fourth example also includes a discussion of additional print jobs being received by the queue while the recipient maintains control. A fifth example will discuss an authenticated recipient selecting which print jobs to print, including print by reference print jobs, and selecting a print job from a network, such as via the Internet or an intranet.

Figure 7:
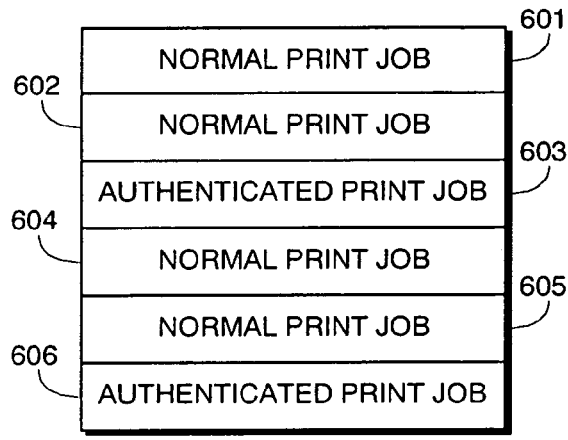
FIG. 7 depicts an arrangement of print jobs in a print queue for a first example.

In a first example, a print queue that contains both normal and authenticated print jobs will be described with reference to FIGS. 7 and 8. In this example, it is assumed that no authentication has been provided by any recipient to the printer. As shown in FIG. 7, the print queue, such as queue 415 in server 40, contains six print jobs 601 to 606. Print jobs 601, 602, 604 and 605 are normal print jobs and print jobs 603 and 606 are authenticated print jobs. Each print job in the queue was received by the queue in ascending order.

Figure 6C:
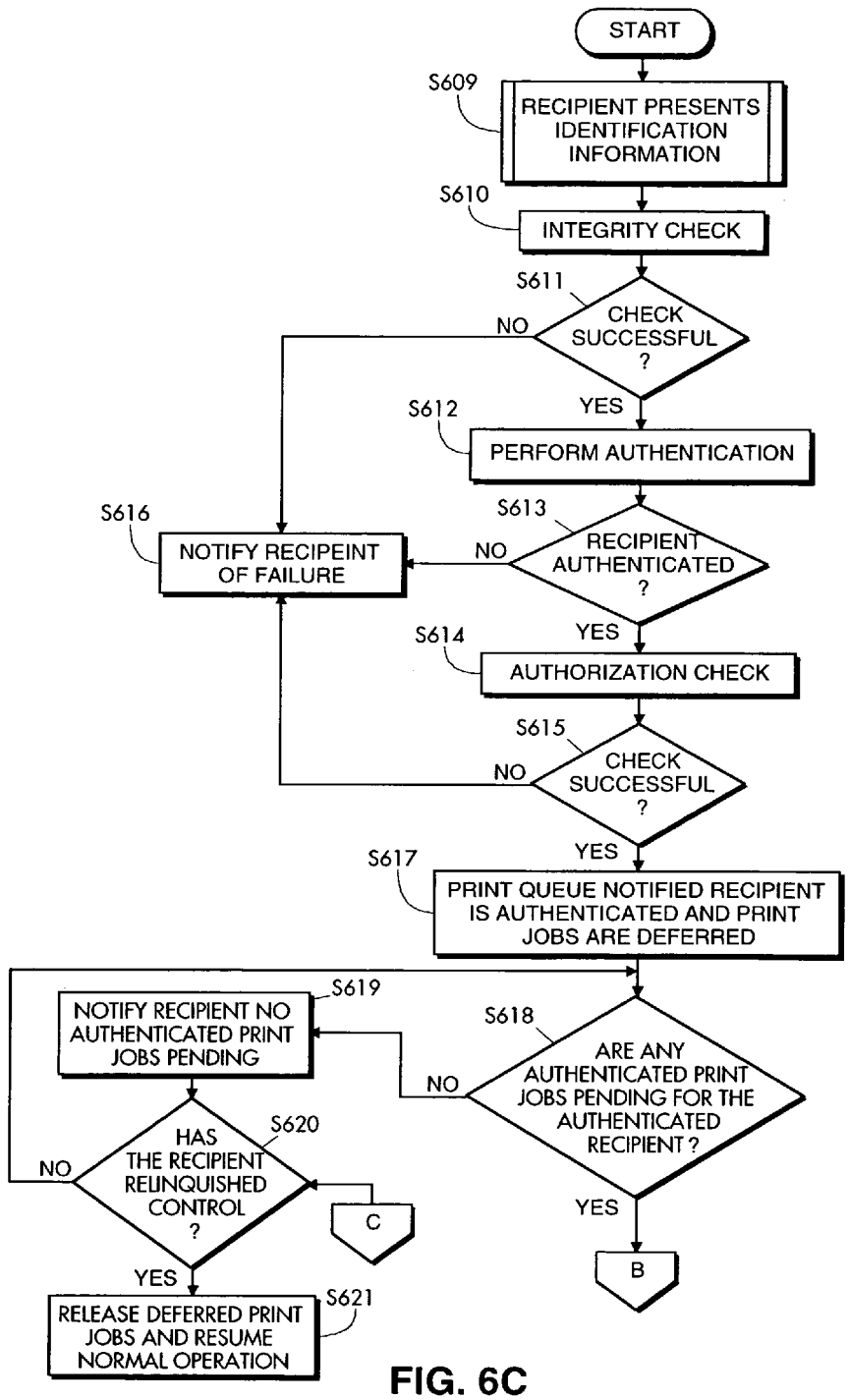
FIG. 6C is a flowchart depicting process steps for obtaining control of a printing device after authentication is successfully completed.
Figure 6D:
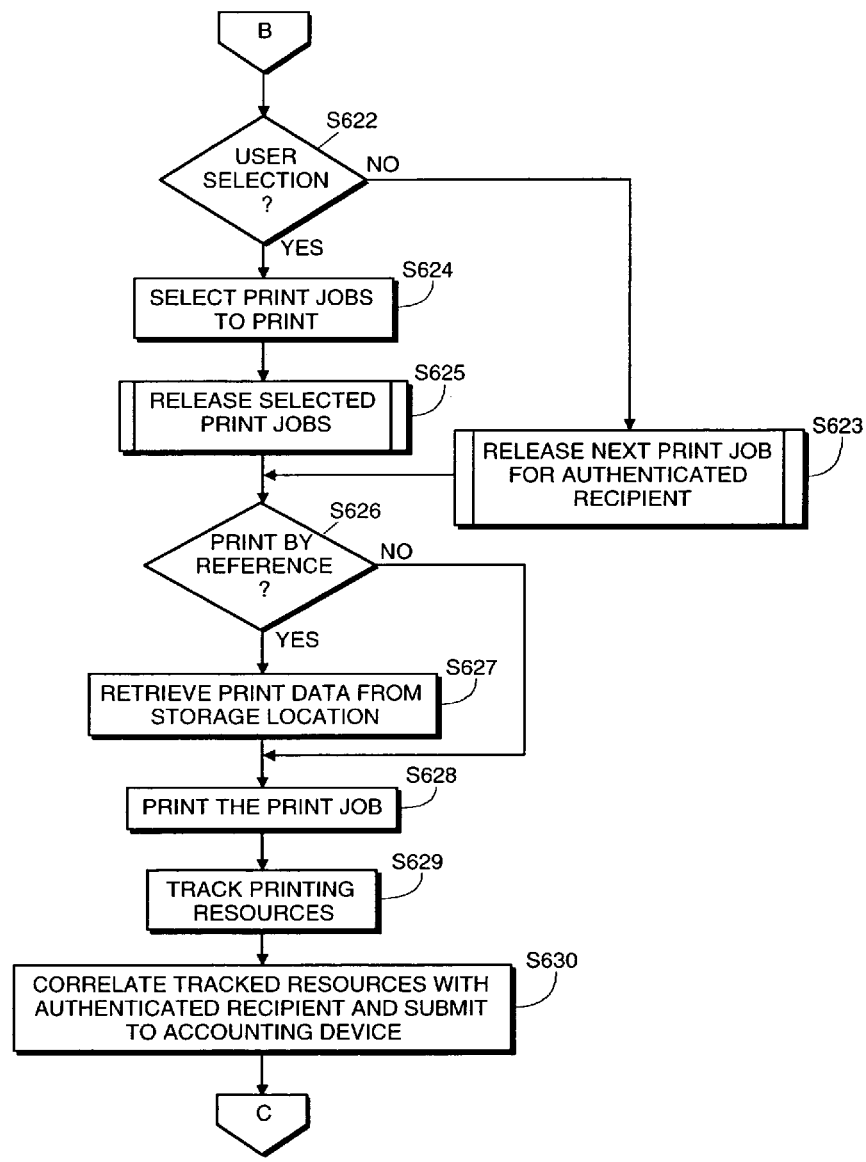
FIG. 6D is a flowchart depicting process steps for processing of a print job for printing after exclusive control is obtained.
Figure 6E:
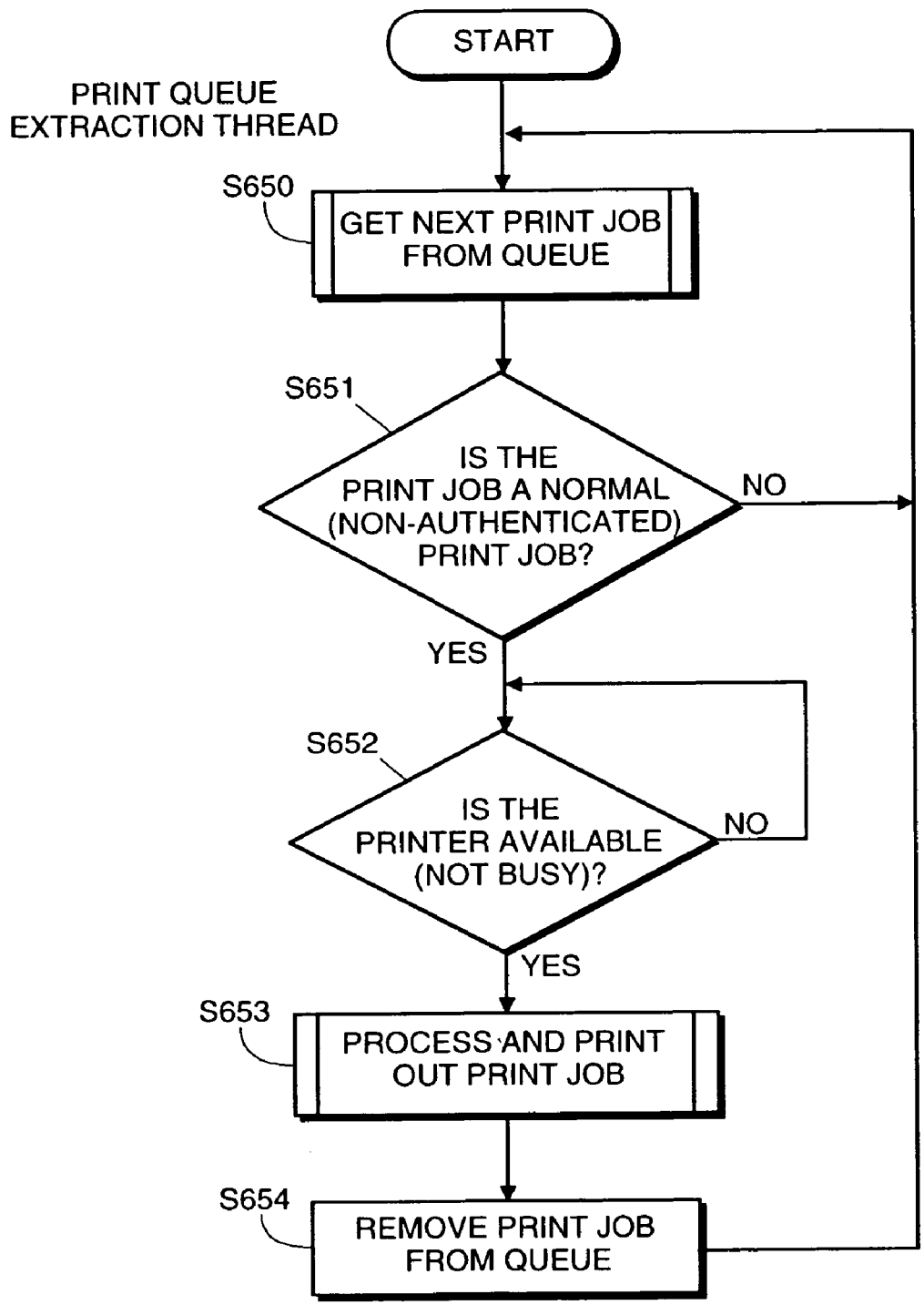
FIG. 6E is a flowchart depicting process steps for a print queue extraction thread.

The print queue extraction thread of FIG. 6E begins processing of each of the print jobs in the order in which they were received. Therefore, since print job 601 was received first, the print queue processes it first. As shown in FIG. 7, print job 601 is a normal print job. Since no other print jobs are being printed by the printer and the print job does not require recipient authentication, the print queue establishes communication with the printer and submits the print data to the printer where it is buffered and printed out (steps S652 and S653 as shown in FIG. 6E). While the printer is busy processing print job 601, print jobs 602 through 606 continue to be stored in the queue until their turn to be processed arrives (the result of a NO determination in step S652).

Once all of the print data for print job 601 has been buffered, the print job is removed from the queue (step S654) and the print queue begins processing the next print job in the queue, print job 602. Since print job 602 is also a normal print job and does not require recipient authentication to be printed, the print data is submitted by the queue to the printer where it begins buffering in the printer while print job 601 completes printing. Once print job 601 completes printing and sufficient print data for print job 602 has been buffered, the printer begins to print print job 602 (step S653).

Once all of the print data for print job 602 has been buffered, the print job is removed from the queue (step S654) and the print queue attempts to submit the next print job to the printer. In the present example, print jobs 603 through 606 are pending in the queue and therefore the print queue attempts to submit print job 603. However, since print job 603 is an authenticated print job, the print queue extraction thread gets the next print job in the queue (step S650).

Therefore, since print job 604 is a normal print job, like print jobs 601 and 602, print job 604 is processed and printed out (steps S652 and S653). Likewise, normal print job 605 is processed and printed after print job 604. Then, following processing of print job 605, the print queue attempts to submit authenticated print job 606. However, like print job 603, print job 606 is not printed and remains in the print queue after print job 603 (step S651). Therefore, after print jobs 601, 602, 604 and 605 have been printed, the print queue appears as shown in FIG. 8.

Figure 8:
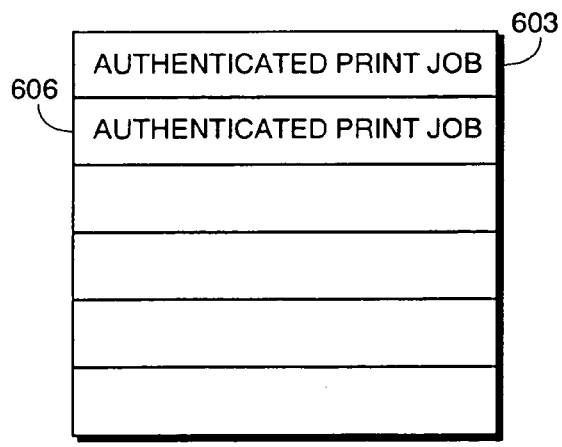
FIG. 8 depicts an arrangement of print jobs in a print queue for a second example.

A second example will now be discussed with regard to FIGS. 6C, 6D and 8, wherein an authenticated recipient retrieves authenticated print jobs 603 and 606 remaining in the queue as shown in FIG. 8. In this example it is assumed that once the recipient selects an option to print all of his authenticated print jobs, he promptly relinquishes control of the printer.

As stated above, there are several ways in which an authenticated recipient can relinquish control over the printer after he has been authenticated. One way would be for the recipient to merely push a release button on the printer after he has been notified that he has been successfully authenticated and has selected a printing option (such as print all authenticated print jobs or select a print job to print). Upon pushing the button, the printer would notify the print queue that the recipient has relinquished control and that it is now available for accepting print jobs, depending upon the printer's buffer space availability of course. However, even where the recipient has been authenticated and presses a button to release control over the printer, if the user opts to print all of his authenticated print jobs pending in the queue, the authenticated print jobs continue to be processed and are printed out ahead of other print jobs. This provides the recipient the ability to gain control over the printer just long enough to have his authenticated print jobs printed out ahead of other print jobs without the recipient having to wait at the printer until all of his print jobs have been printed before he relinquishes control. Therefore, the recipient can be authenticated and promptly relinquish control so that his print jobs will be printed, but he does not have to wait at the printer and can leave the printer and return at a later time to retrieve his hard copy printouts if he wants to.

Other methods for relinquishing control may include the recipient entering a code on a keypad or removing his smart card from the smart card reader. With the latter method, the recipient presents his smart card to the smart card reader, whereby he is authenticated and gains control over the printer. As long as the recipient's smart card remains in the smart card reader, he remains authenticated and maintains control over the printer. Once the recipient removes his smart card from the reader, he is no longer authenticated and relinquishes control over the printer. As stated above, the invention is not limited to any particular method of relinquishing control and the foregoing are merely examples of some of the methods that may be employed.

Returning to the present example, it should be noted that the present example relates to a case where only authenticated print jobs are pending in the queue at the time the recipient is authenticated and that no additional print jobs are received by the queue after the recipient is authenticated. A case where print jobs other than authenticated print jobs are pending in the queue when the recipient is authenticated or where print jobs are received by the queue after the recipient has been authenticated will be discussed in more detail below. Additionally, in the present example, it is assumed that the recipient is authenticated using a smart card. Of course, as stated above any method of authentication could be employed and the invention is not limited to use with smart cards. However, for the sake of brevity, only the use of smart cards will be discussed in detail.

Referring to FIG. 6C, in order to have print jobs 603 and 606 printed out, the recipient holding the proper authentication (identification) information presents this information to the printer in step S609. For the present example, the recipient presents smart card 56 to smart card reader 55 attached to printer 50. Once the recipient presents his smart card to the smart card reader, the printer processes the information through smart card interface 365 and smart card interface driver 354 to control logic 320. The printer then performs a verification procedure to validate the integrity and authenticity of the unique identification information (step S610). If the integrity and authenticity check fails (step S611), the user is notified of such in step S616. If the integrity and authenticity check is successful (step S611), an authentication process is performed in an attempt to authenticate the recipient (step S612). This may comprise printer 50 performing a "challenge/response" mechanism, or other process to validate the identity of the recipient (in this case, the smart card holder).

In step S613, a determination is made whether the attempt to authenticate the recipient is successful. If the recipient is authenticated, flow proceeds to step S614. If the attempt to authenticate has failed, then the recipient is notified of the authentication failure (step S616). The notification may be provided via a visual display having an error message, an alarm on the printer or some other device to indicate that the authentication process has failed.

After authentication, an optional check to determine whether the recipient is authorized to use the device may be performed (step S614). This authorization verification may be performed through a mechanism that includes but is not limited to directory queries and access control list lookups. If the recipient is not authorized to use the device, then he is provided with an authorization failure (step S616). If the recipient is authenticated and authorized, he may receive a notification to this effect.

Once the recipient has been authenticated and optionally authorized (if an authorization check is provided for), the recipient gains exclusive control of the device in the present example and all print jobs pending in the queue are deferred and prevented from being printed (step S617). Additionally, in step S617, if the print queue has registered to receive a notification from the printer, it is notified that the recipient has been authenticated. One way print jobs may be deferred is by the printer providing an indication to the queue that it is "busy" or that the printer's buffer is full. Recall that in order for print data to be submitted by the queue to the printer, the queue generally attempts to establish communication with the printer and determines whether the printer is available for accepting print data. Therefore, if the printer appears busy, then it is unavailable for accepting print data, thereby preventing the print jobs in the queue from being sent to the printer. In the present example, after the recipient has been authenticated, the printer appears busy for all print jobs in the queue and continues to appear busy until the recipient relinquishes control of the printer. It should be noted that the present invention is not limited to a busy or buffer full indication and any other mechanism for preventing the print jobs from being buffered and printed may also be utilized.

Upon receiving notification that the recipient has been authenticated (step S617), the queue determines whether any authenticated print jobs are pending in the queue for the authenticated recipient (step S618). If no authenticated print jobs are pending in the queue for the authenticated recipient, the recipient is notified of such in step S619. If print jobs are pending in the queue for the authenticated recipient, then flow proceeds to step S622 in FIG. 6D. In the present example, print jobs 603 and 606 are pending in the queue.

As seen in FIG. 6D, in step S622 a determination is made whether the recipient has opted to select a print job to print. In this regard the recipient may select one or more print jobs from a list of print jobs pending in the queue. Alternatively, the recipient may select a print job from a remote storage location. A more detailed discussion of recipient selection of a print job is provided below with regard to FIGS. 17A through 17D. If the recipient opts for user selection, then flow proceeds to steps S624 and S625 where the recipient selects a print job and the selected print job is released to be printed. If the recipient does not opt for user selection, but rather opts to print all of his authenticated print jobs pending in the queue, then flow proceeds to step S623 where the next authenticated print job pending in the queue for the authenticated recipient is released to be printed. In the present example, once the user opts to print all of his authenticated print jobs, he relinquishes control of the printer by removing his smart card from the reader.

The next authenticated print job (print job 603 in the present example) in the queue is processed through steps S626 to S630, with flow then returning to step S620 of FIG. 6C. In the preferred embodiment, the recipient is required to maintain control over the printing device in order to print all of his authenticated print jobs. That is, each authenticated print job is processed one at a time from step S618 to step S630 and back to step S620. As such, upon completion of processing print job 603, the printer begins a new process to process the next authenticated print job (print job 606). In the process for print job 606, the print queue again requests the recipient's authentication information from the printer. If the recipient has relinquished control in step S620, the printer will provide a negative response or no response at all. Therefore, in the preferred embodiment, once the recipient relinquishes control (here, by removing his smart card), any authenticated print jobs pending in the queue for which the print queue has not yet requested the recipient's identification information will remain in the queue and will not be printed until the recipient is authenticated again. Therefore, once the recipient has relinquished control and print job 606 has not yet begun to be processed, print job 606 remains in the print queue.

Alternatively, once the recipient has been authenticated and opts to print all of his authenticated print jobs pending in the queue, the print queue may utilize the recipient's identification information to release and process all authenticated print jobs intended for the recipient (print jobs 603 and 606) in the queue in step S623, before a determination is made in step S620 whether the recipient has relinquished control. In this case, both print jobs 603 and 606 would be processed and the print queue would then be empty.

Returning to FIG. 6D, when a print job has been released for printing in either step S625 or step S623, a determination is made whether the print job is a print by reference print job (step S626). In the present invention, a print by reference print job is one in which the print data is not stored in the print queue, but rather is stored in a remote storage location with the print job in the queue containing a reference to the remote storage location. If the print job is a print by reference, then the queue retrieves the print data from the remote storage location in step S627. If the print job is not a print by reference, then flow proceeds to step S628.

In step S628 the printing process commences and in step S629, printing resources utilized during the printing operations are tracked. For example, resources such as the number and type of paper or the amount and type of ink utilized during the printing operations may be tracked. The tracked resources are then correlated with the authenticated recipient's identification information and submitted to an accounting device that utilizes the tracking information (step S630). Such an accounting device may be a print server or other device that employs an accounting program. It should be noted that in some cases resource tracking may not be desired and therefore steps S629 and S630 may be omitted.

After printing the authenticated print jobs, a determination is made whether the recipient has relinquished control of the printer (step S620 in FIG. 6C). In the present example, recall that the recipient has relinquished control promptly after being authenticated and selecting an option to print all of his authenticated print jobs. That is, he promptly removes his smart card from the smart card reader, thereby relinquishing control over the printer's print capabilities. In the preferred embodiment, print job 603 is processed and after the recipient has relinquished control, the printer provides a negative response for printing print job 606 and it remains in the queue with the printer returning to normal printing operation where it releases all deferred (non-authenticated) print jobs pending in the queue (step S621) (i.e. the printer no longer provides a busy indication).

Of course, with regard to the alternate embodiment, when the recipient relinquishes control of the printer before print job 606 is processed, the determination in step S620 is not performed until after print job 606 has been processed and therefore, the printer does not return to normal printing operations until all authenticated print jobs have completed printing.

A third example will now be described with regard to FIGS. 6C, 6D and 9. In this example, print jobs 1001 to 1005 are pending in the queue at the time the recipient is authenticated, at least one of which is an authenticated print job requiring authentication of the recipient to be printed. Like the second example, in the present example the recipient presents the proper authentication information using a smart card device and promptly removes his smart card from the smart card reader. Also, in the present example the recipient does not opt for user selection of print jobs and none of the print jobs are print by reference.

Figure 9:
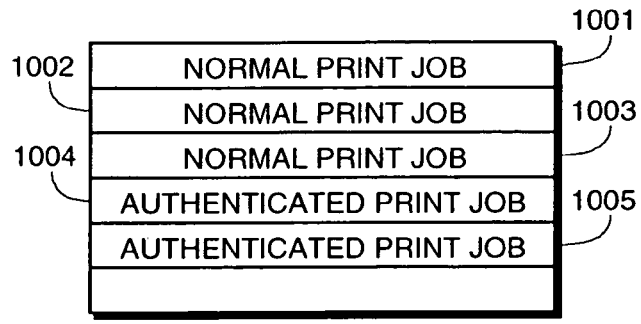
FIG. 9 depicts an arrangement of print jobs in a print queue for a third example.

In respect of the present example, the print jobs pending in the print queue at the time just prior to step S609 are as shown in FIG. 9. Therefore, just prior to the recipient presenting his smart card to the smart card reader, print jobs 1001 through 1005 are pending in the queue, with print jobs 1004 and 1005 being the authenticated print jobs pending for the authenticated recipient.

Referring again to FIG. 6C, once the recipient has been authenticated and authorized (if provided for), the print queue is notified that the recipient has been authenticated and all print jobs pending in the queue are deferred in step S617 as described above. Again, deferring the print jobs may be accomplished by the printer merely providing an indication to the queue that it is busy or that the buffer is full, thereby preventing the print jobs in the queue from being submitted to the printer.

Once all of the print jobs pending in the queue have been deferred, the queue determines whether any authenticated print jobs are pending for the recipient (step S618). The determination may be made by matching the authenticated recipient's unique identification information to the print jobs pending in the queue. If a match is found, then flow proceeds to step S622 of FIG. 6D. If no matching print jobs are found, then the recipient is notified of such in step S619. In the present example print jobs 1004 and 1005 are authenticated print jobs matching the authenticated recipient. Accordingly, flow proceeds to step S622 where the recipient opts for printing all of his authenticated print jobs. Therefore, flow proceeds to step S623 where print job 1004 is released to print and processed through steps S626 to S630.

Then, flow returns to step S620 of FIG. 6C to determine whether the recipient has relinquished control. Recall that in the present example, the recipient removes his smart card from the reader promptly after opting to print all of his authenticated print jobs. Accordingly, in step S620 it is determined that the recipient has relinquished control and print job 1005 is not released and printed. Therefore, once print job 1004 has printed, the remaining non-authenticated (normal) print jobs in the queue are then released and processed accordingly (step S621).

Figure 10:
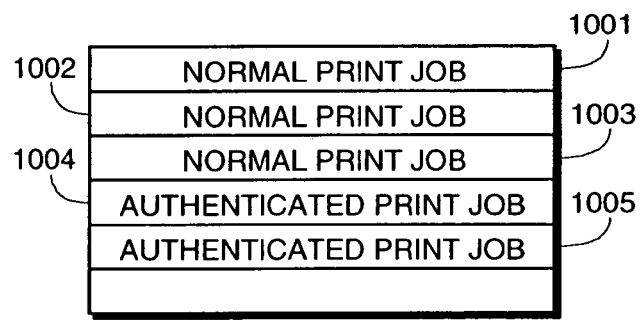
FIGS. 10 through 12 depict arrangements of print jobs in a print queue for a fourth example.

A fourth example will now be described with regard to FIGS. 6C, 6D and 10 through 12. In this example, the print queue of FIG. 10 is initially the same as that shown in FIG. 9. However, unlike the previous examples, the recipient does not promptly relinquish control over the printer once he is authenticated, but rather maintains control over the printer. Also, in the present example, after the recipient has been authenticated, additional print jobs are received by the queue, the recipient does not opt for user selection, and none of the print jobs are print by reference.

In the present example, steps S609 through S623 are the same as described above. To summarize these steps, once the recipient is authenticated, all print jobs in the print queue are deferred and authenticated print job 1004 is processed and released to print. Flow then returns to step S620 where it is determined that the recipient has not relinquished control and therefore flow returns to step S623 to process and release print job 1005. However, unlike the third example, the print jobs remaining in the queue after all authenticated print jobs have been printed (here, print jobs 1001, 1002 and 1003) are not released, but rather remain deferred in the print queue. This is because the recipient has not relinquished control of the printer in step S620. Recall that one way for a recipient to maintain control over the printer is to merely leave his smart card in the reader, thus continuing to defer printing of all print jobs remaining in the queue that are not authenticated print jobs for the recipient.

Accordingly, as shown in FIG. 6C, in step S620 a determination is made whether or not the recipient has relinquished control. Since the recipient has not relinquished control, the print jobs remain deferred with flow returning to step S618 to determine if any additional authenticated print jobs are pending in the queue. That is, a determination is made whether any new authenticated print jobs have been received by the queue.

Figure 11:
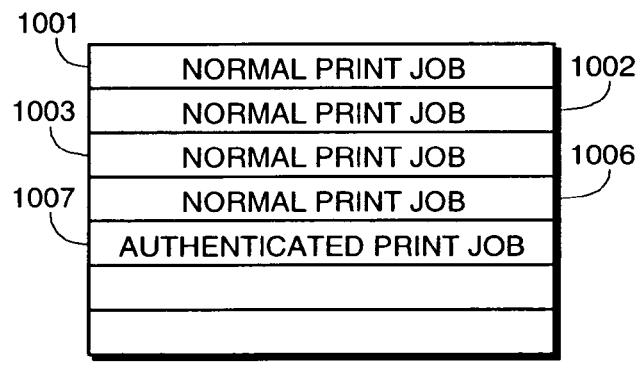

Assuming that the recipient has not yet relinquished control, i.e. has not removed his smart card from the smart card reader, the present example will now be expanded to include receipt of additional print jobs while the recipient maintains control over the printer. As shown in FIG. 11, print jobs 1001, 1002 and 1003 remain deferred in the queue. Additionally, normal print job 1006 and authenticated print job 1007 are received by the queue while the recipient maintains control over the printer. When additional print jobs are received, the processing of these print jobs begins at step S603 of FIG. 6B. Once the print job is added to the queue (step S604), flow returns to step S603, unless the print job is an authenticated print job. When the print queue insertion thread determines that the print job received is an authenticated print job (step S605) and that the intended recipient is authenticated at the time the job arrives (step S606), it then waits for another print job (step S603). Therefore, print job 1006 in this example is deferred. However, since the recipient has already been authenticated, the operations as defined in steps S618 to S621 of FIG. 6C determine that an authenticated print job intended for the authenticated recipient is available and thus print job 1007 is processed and released to be printed similar to print jobs 1004 and 1005. As a result, any authenticated print jobs intended for the recipient that are received by the queue during a period in which the recipient maintains control over the printer's print capabilities are printed out, while normal print jobs are deferred from being printed. Again, once the recipient relinquishes control, the printer returns to normal printing operation and print jobs 1001, 1002, 1003 and 1006 are released and printed.

Figure 12:
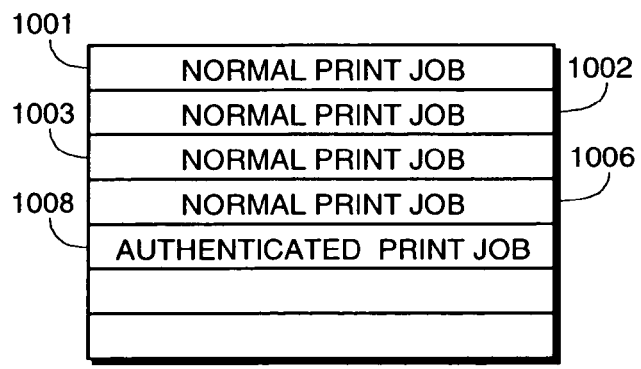

In a fifth example, FIG. 12 shows a queue after print jobs 1004, 1005 and 1007 have been printed with print jobs 1001, 1002, 1003, and 1006 remaining deferred and authenticated print job 1008 is received by the queue. Authenticated print job 1008 requires authentication of a different authenticated recipient. That is, the recipient who has been authenticated at the printer is not the intended recipient for the authenticated print job 1008. Again, steps S603 to S605 of FIG. 6B are the same as described above. However, in step S606 a determination is made whether the intended recipient is authenticated. Since print job 1008 is an authenticated print job, but is for a different authenticated recipient, it is not released and printed. Rather, the queue registers with the printer to receive notification upon authentication of the intended recipient (step S607) and then returns to step S603. This job is not released and printed until the print queue is notified that the recipient holding the proper identification information for print job 1008 has been authenticated at the printer.

The foregoing examples describe the use of a smart card to gain control over the printer's print capabilities. However, as previously mentioned, another device such as a keypad or biometric device could also be utilized to accomplish the same function. The foregoing examples also describe the invention in an arrangement where a print queue is contained within a server and all data is stored in the print server. However, as will be described below, the present invention may be employed in various other arrangements.

Figure 13:
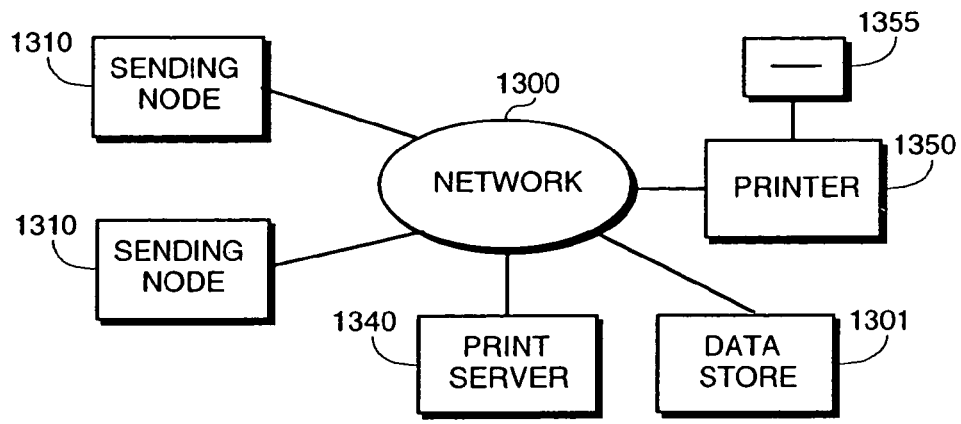
FIG. 13 depicts an alternate system arrangement in which the invention may be employed.

One alternative arrangement in which the invention may be employed is depicted in FIG. 13. As seen in FIG. 13, the network may include data store 1301 as well as the aforementioned print server. The data store may be an additional storage medium, such as a hard disk attached to the print server, a separate computer having a hard disk for storing print data, or some other type of storage medium. With this arrangement, print data submitted from the sending node may be stored in the data store and a reference to the stored print data file name and location submitted to the print queue. Alternatively, rather than print data being submitted from a sending node to the data store as part of a print job submission, the print data may reside in the data store prior to the print job being submitted from the sending node. In this case, the print job submitted to the queue would merely provide a reference to the print data storage location.

The operation of this arrangement works similarly to the above examples. In one difference, once the print job is released to print (step S623), a determination is made whether the print job is a print by reference print job in step S626. Since the print job is a print by reference, the print queue utilizes the print data storage reference location to retrieve the stored print data (step S627) and then submits the retrieved print data to the printer.

The network depicted in FIG. 13 may be the Internet. Once the print job has been released to print, the print queue retrieves the print data over the Internet from the data store and processes it to be printed. Accordingly, in order for the print queue to retrieve print data over the Internet, the print server is provided with the ability to access the Internet through FTP/HTTP client 395 or 495 shown in FIGS. 3 and 4.

Figure 14:
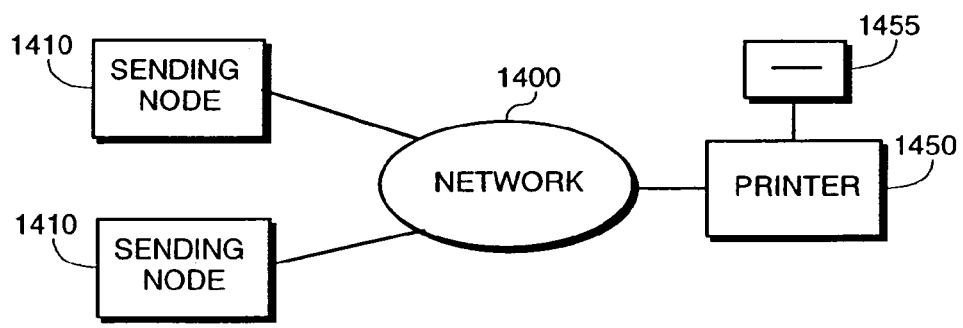
FIG. 14 depicts an alternate system arrangement in which the invention may be employed.

The invention is also not limited to an arrangement in which the queue is contained within a print server. Rather, the queue may be contained within the printer itself, or within a personal computer or other device. Such an arrangement may provide a system similar to that shown in FIG. 14. In FIG. 14, sending nodes 1410 communicate with printer 1450 over network 1400. Attached to printer 1450 is smart card reader 1455. The queue may be provided in the printer in a storage disk such as queue 315 in printer memory 51 shown in FIG. 3. Alternatively, the queue may be provided in fixed disk 280 of computer 10. The operation of this arrangement would be similar to that described above with one difference being that the printer does not need to communicate over a network to an external queue in a print server. Rather, the host computer and the printer themselves communicate to provide the functionality of the invention.

Figure 15:
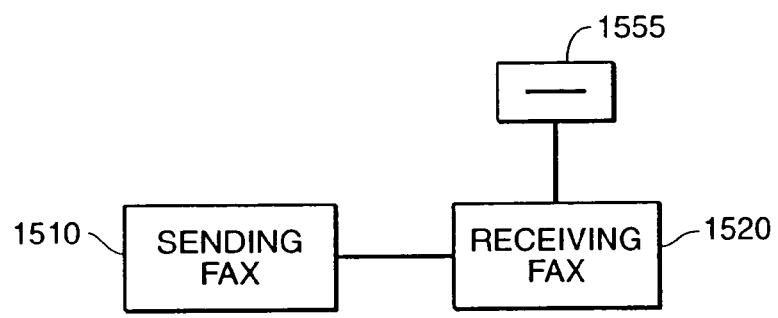
FIG. 15 depicts a facsimile system arrangement in which the invention may be employed.

Moreover, the present invention is not limited to an arrangement of a computer (sending node) and printer communicating over a network. In this regard, FIG. 15 depicts an arrangement where the present invention is employed in a facsimile model. To employ the present invention in a facsimile model, a facsimile machine capable of providing the recipient's unique identification information at the sending facsimile is utilized. Therefore, the sending facsimile may also utilize the smart card interface as described above. At the receiving end, the facsimile machine stores and defers printing of facsimile transmissions similar to the printer model described above. Therefore, the present invention of controlling printout operations of facsimile transmissions stored in a queue is performed in the same manner as the printer model described above.

In a further aspect of the invention, rather than opting to print all authenticated print jobs, a mechanism for the recipient to selectively choose which print jobs to print may be provided for. This option refers to user selection steps S622, S624 and S625 of FIG. 6D. One way to accomplish the foregoing may be to provide a display at the printer, such as display 1700 of printer 1750 shown in FIG. 17A. The printer may also be provided with a keypad 1720 to allow the recipient to choose from among various options shown on the display. Alternatively, the display itself may be a touch panel display, thereby eliminating the need for a keypad.

Figure 17A:
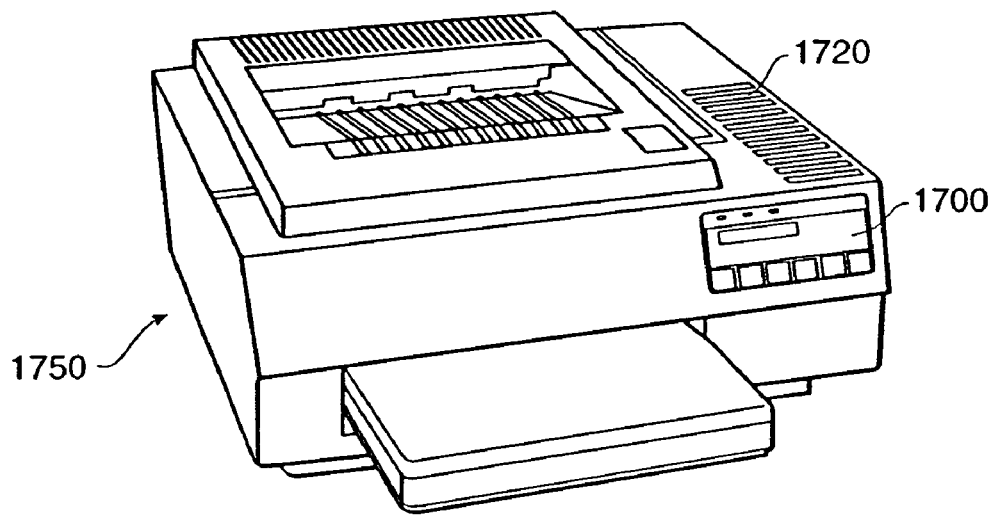
FIG. 17A depicts a printer having a display and keypad that may be used in practicing the invention.
Figure 17B:
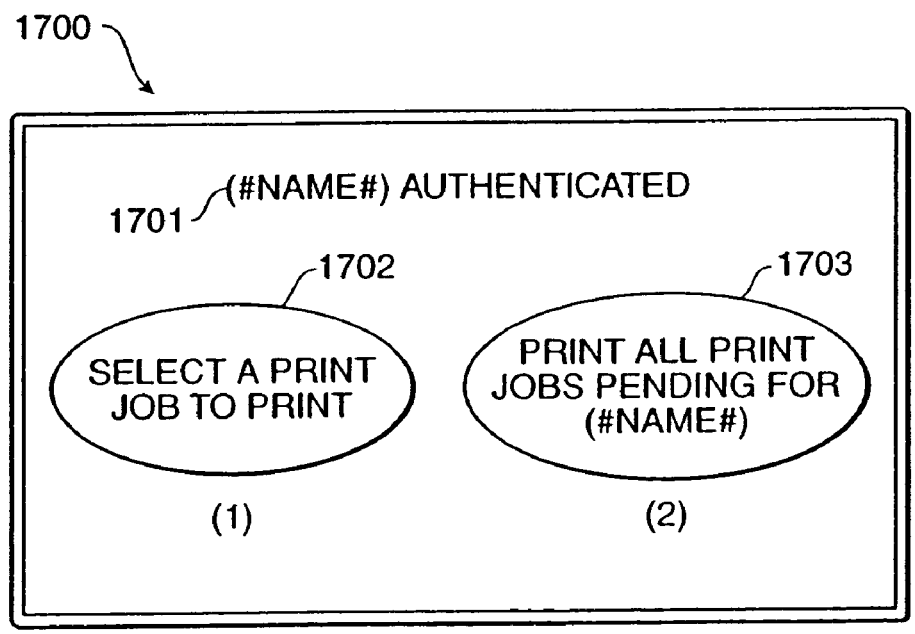
FIGS. 17B through 17D depict the display of FIG. 17A providing various printing options to the recipient.

FIG. 17B depicts one example of display screen 1700. As seen in FIG. 17B, once the recipient is authenticated, the display may provide an indication to the recipient that he has been authenticated (1701) and also provide him with the option to either select a print job to print (1702) or to print all print jobs pending in the queue for him (1703). In this aspect of the invention, the recipient is authenticated in the same manner as described above. However, once the recipient is authenticated and opts to select a print job to print, all print jobs in the queue are deferred until the recipient selects which print jobs to print. If the recipient selects option 1703 (opting to print all of his authenticated print jobs), then as described above, all authenticated print jobs pending in the queue, as well as those received by the queue while the recipient maintains control over the printer, are processed and printed out in the same manner as described above.

Figure 17C:
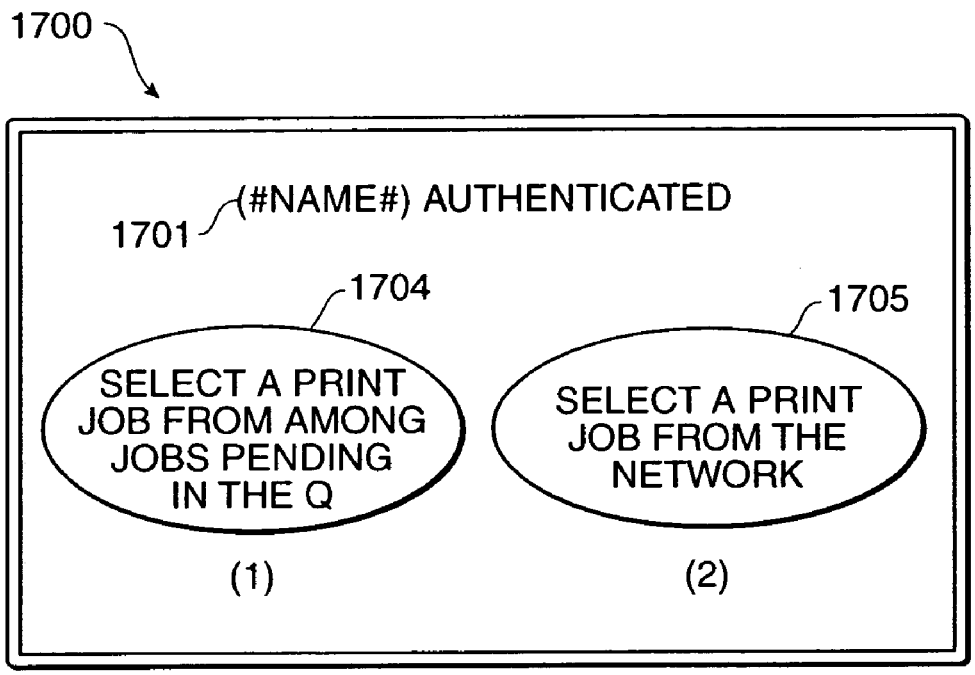

However, in the case where the recipient selects option 1702 (select a print job to print corresponding to step S624), then additional options may be provided to the recipient on display 1700. As shown in FIG. 17C, one further option is option 1704 to select a print job from among those pending in the queue. In a case where this option is selected, a listing of the print jobs pending in the queue is provided on the display. The listing may include all print jobs that are matched with the recipient's identification information, or may list all print jobs pending in the queue, including normal and authenticated print jobs but preferably not jobs intended for other recipients. From this listing, the recipient can select one or more print jobs to print, either one of his normal print jobs or one of his authenticated print jobs. These print jobs are then released and processed in step S625. As long as the recipient maintains control over the printer, all print jobs in the queue are deferred until they are either released by the recipient selecting them from the display or the recipient relinquishes control of the printer.

As a result of the foregoing, if the queue contains five authenticated print jobs all belonging to the recipient and numbered 1 through 5 respectively, the recipient can choose to only print authenticated print job 5 without printing authenticated print jobs 1 to 4. He can then return at a later time and print any of print jobs 1 to 4.

Figure 17D:
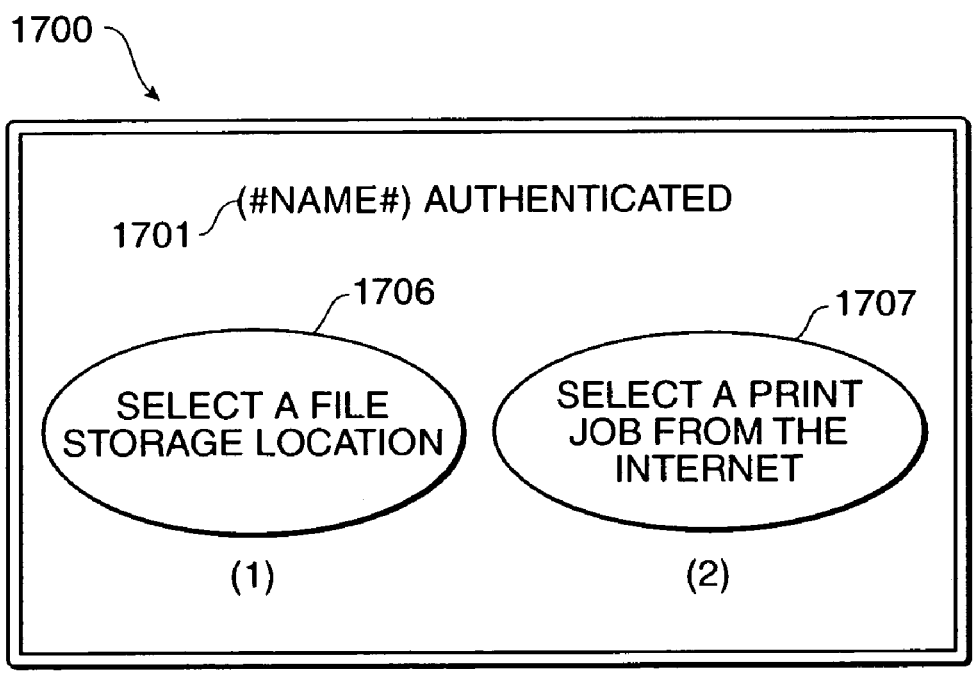

Another option shown in FIG. 17C is for the recipient to select a print job from a network (1705), i.e. a location on a network other than the print queue. The network may be any type of network, including a WAN (Wide Area Network), a LAN (Local Area Network), an intranet, the Internet, a USB, 1394, home network, etc. Print data may be browsed and retrieved from the Internet, an intranet, or e-mail using a method similar to that disclosed in co-pending U.S. application Ser. No. 09/465,835, entitled "System For Retrieving And Printing Network Documents," filed Dec. 17, 1999, the contents of which are incorporated by reference as set forth in full herein. In this embodiment however, the front panel interface of the device serves as the web browser described in application Ser. No. 09/465,835. Upon selecting option 1705, additional options as shown in FIG. 17D may be displayed.

It should be noted however, that in the current aspect of the invention, i.e. printing data over the Internet or an intranet, the print jobs downloaded are not necessarily authenticated print jobs in the sense that authenticated print jobs would ordinarily be provided with the recipient's authentication information. In more detail, in each of the previous aspects print jobs were submitted from a sending node to a print queue over a network. As such, the recipient's identification information was provided at the sending node in order for the print jobs to be identified as authenticated print jobs. In order to print those print jobs, the recipient had to be authenticated at the printer and then the authenticated print jobs were printed out.

In the present aspect however, the print job is not being submitted by a sending node but rather is being requested from the printer itself after the recipient has been authenticated and while he maintains control of the printer. Therefore, the printer already knows who the authenticated recipient is and that the recipient has control of the printer. Therefore, all print jobs printed over the Internet or an intranet are released and printed once they are downloaded because the recipient has already been authenticated and has control of the printer.

Another aspect of the invention concerns accurate accounting of resources used in printing operations, such as the amount and type of paper used and the amount of ink used. In more detail, accurate accounting of resources may be desired in order to bill a particular department within an office or a particular person using the resources. Accounting is most commonly accomplished by software in a print server that tracks print jobs based on who submitted the print job. However, this accounting method does not accurately reflect the actual recipient who is using the resources, but only identifies the sender or sending department.

Therefore, the present invention provides for utilization of an accounting application program in conjunction with the authenticated recipient's unique identification information. In the present aspect, once the recipient has been authenticated, the printer resources utilized during the printing operations are tracked by the printer (step S629). The printer then correlates the tracked resources with the authenticated recipient's identification information (step S630). The tracked data may then be submitted by the printer to a device that contains an accounting application program, such as print server 40. Alternatively, the printer may register with the print server or another device utilizing the accounting program and the print server or device may access the printer periodically to collect the accounting information. An accounting application program in the print server then utilizes this information to match resources utilized during all printing operations while the recipient has control of the printer and to bill the department that the recipient belongs to. In this manner, the accounting application can track the resources to the person actually utilizing them, rather than matching them to a sender who may or may not be utilizing them.

The foregoing provided a description of obtaining exclusive control in conjunction with authentication where exclusive control was not obtained until the recipient had been successfully authenticated. The following describes a process for obtaining exclusive control in conjunction with authentication, but with exclusive control being granted before the recipient is successfully authenticated.

Figure 6F:
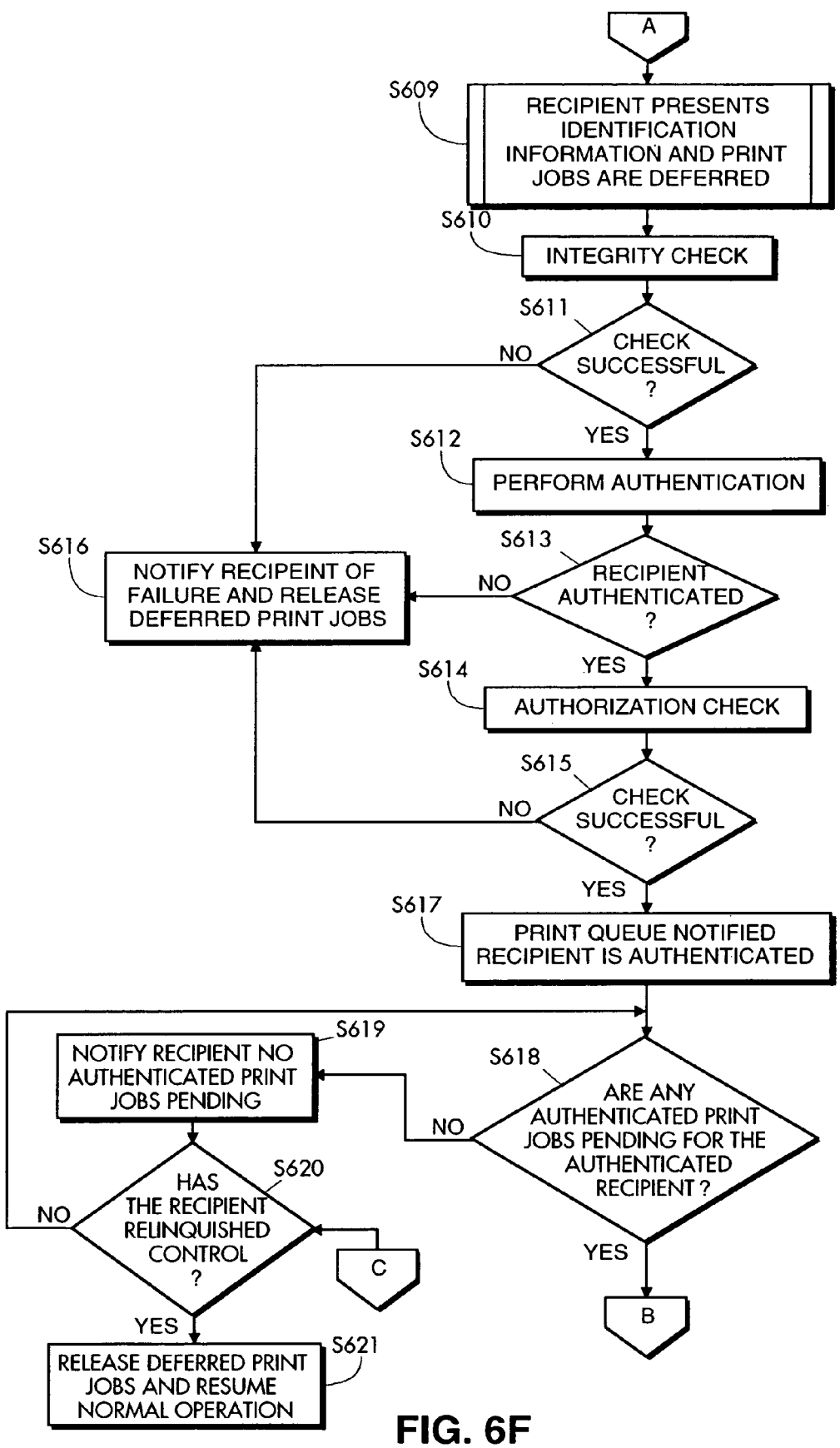
FIG. 6F is a flowchart depicting process steps for obtaining control of a printing device before authentication is successfully completed.

Generally, the process is similar to that described above with the regard to FIGS. 6A to 6D. However, some changes in the process steps are required and therefore FIG. 6F is substituted for FIG. 6C. Accordingly, the process steps depicted in FIGS. 6A and 6B apply equally to both a case where exclusive control is obtained only after the recipient has been successfully authenticated and where exclusive control is obtained before the recipient has been successfully authenticated. As such, a description of FIGS. 6A and 6B will not be repeated here, but rather, only FIG. 6F will be discussed.

As seen in FIG. 6F, step S609 is different from step S609 of FIG. 6C. In FIG. 6C, the recipient merely presented his identification information and then the printer processed the information to perform authentication in steps S610 to S615. After the recipient was successfully authenticated in FIG. 6C, then in step S617 all print jobs in the print queue were deferred. Therefore, exclusive control in FIG. 6C was not obtained until step S617. In FIG. 6F, however, when the recipient presents his identification information to begin the authentication process (step S609), the printer simultaneously provides an indication to the queue that it is busy, thereby deferring all print jobs pending in the print queue. Accordingly, exclusive control is obtained in FIG. 6F in step S609 rather than step S617.

In this embodiment, since the recipient gains exclusive control before a successful authentication process, a mechanism to release exclusive control in the event of an authentication failure is provided for. Accordingly, if any of steps S610 to S615 (the authentication process steps) result in an authentication (or authorization) failure, then in step S616 the recipient is notified of the failure and exclusive control is automatically relinquished. Thus, in comparison to FIG. 6C, step S616 in FIG. 6F includes the additional process of releasing all deferred print jobs.

If the recipient is successfully authenticated in steps S610 to S615, then in step S617, the printer notifies the print queue that the recipient has been authenticated. Therefore, in contrast to FIG. 6C, in FIG. 6F step S617 excludes the process of deferring the print jobs in the print queue since this process was previously performed in step S609.

The remaining process steps of FIG. 6F (steps S618 to S621) are the same as those described above with regard to FIG. 6C and therefore the description of these steps will not be repeated here.

As can readily be seen from the foregoing, exclusive control can be obtained in conjunction with authentication, either before the recipient is successfully authenticated, with control being automatically relinquished in the event of an authentication failure, or only after a successful authentication process has been performed. Although the foregoing focused on obtaining exclusive control in conjunction with authentication, as stated above, exclusive control can also be obtained in the absence of authentication. This process will now be described in more detail.

Generally, the process of obtaining exclusive control in the absence of authentication is similar to that described above with regard to FIGS. 6A to 6D (embodiment 1), and FIGS. 6A, 6B, 6D and 6F (embodiment 2). However, process steps involving authentication are omitted.

Figure 16:
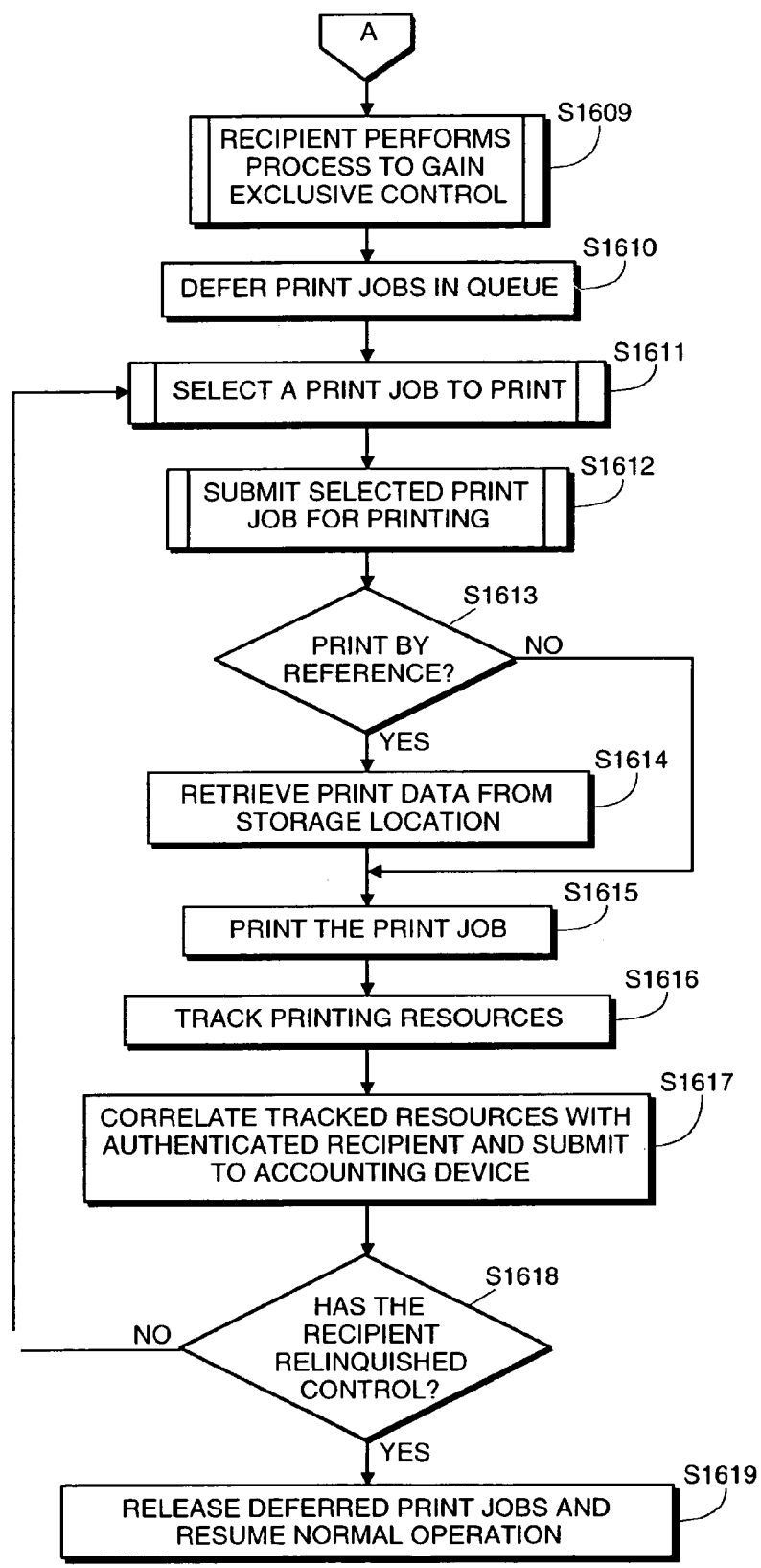
FIG. 16 is a flowchart of process steps for obtaining exclusive control in the absence of authentication.

FIG. 16 is a flowchart of process steps for obtaining exclusive control in the absence of authentication. In step S1609, the recipient performs a process to gain exclusive control. As described above, any type of process to gain exclusive control could be employed and the invention is not limited to any particular type of process. For instance, the recipient could press a button on a control panel of the printer to gain control, or he could enter a username. In the latter case, an optional process could be performed to confirm whether the recipient's username is contained in a listing of authorized users. If a match is found, the user would be permitted to gain control. If a match is not found, then the user would be notified of a failure. These optional steps are not depicted in FIG. 16, but would be performed after step S1609 and would be similar to steps S614, S615 and S616 of FIG. 6C. Assuming that the recipient performs a process to gain control that does not involve authorization (such as pressing a button), flow proceeds to step S1610.

In step S1610, once the recipient performs the process to gain exclusive control, all print jobs pending in the print queue, as well as those received by the print queue while the recipient maintains control, are deferred from being printed. Again, deferring the print jobs may be performed by any process as described above.

In step S1611, the recipient performs a process to select a print job to print. The process may be any of those described above with regard to FIGS. 17A to 17D. That is, the recipient may select a print job pending in the print queue, or he may select a file from a remote storage location over a network, including the Internet or an intranet. Once the recipient performs the process to select the file or print job, he submits the print job for printing by the printer (step S1612).

Steps S1613 to S1617 are the same as steps S626 to S630, respectively, of FIG. 6D. Therefore, if any of the print jobs are print by reference, the print data is retrieved from the storage location, and printing resources utilized in printing the print job are tracked and correlated to the recipient. It should be noted that steps S1616 and S1617 can only be performed where the recipient has been identified. That is, in order for the printing resources to be correlated to the recipient, the recipient has to provide some identification information (e.g. username) to the printer in step S1609. Therefore, if the recipient merely presses a button, he is an anonymous recipient and any tracked resources could not be correlated to him. In this case, steps S1616 and S1617 could be omitted.

Once the print job has been printed, a determination is made whether the recipient has relinquished control (step S1618). Again, relinquishing control could be performed by any of the processes described above and the invention is not limited to any particular process. If the recipient maintains control, flow returns to step S1611 for the recipient to select another print job to print. In this regard, the printer waits for the recipient to select another print job in step S1611 and remains busy for other print requests (i.e. the print jobs pending in the queue remain deferred) until the recipient manually relinquishes control. Of course, a timeout mechanism could also be employed so that after a set length of inactivity by the user, the printer would automatically relinquish control. Once control has been relinquished, then all of the deferred print jobs in the queue are released and the printer resumes normal printing operations (step S1619).

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for obtaining exclusive control of a printing device's print capabilities by a recipient to print data intended for the recipient, the method comprising the steps of:
   authenticating the recipient;
   providing the recipient exclusive control of the printing device's print capabilities after the recipient has been authenticated; and
   temporarily deferring print data not intended for the recipient, which is input to the printing device prior to print data intended for the recipient, from being printed and printing print data intended for the recipient during a period in which the recipient has exclusive control of the printing device's print capabilities.

2. A method according to claim 1, wherein the recipient gains exclusive control of the printing device's print capabilities by being authenticated utilizing a hardware token.

3. A method according to claim 1, wherein the print data not intended for the recipient is deferred by the printing device providing a busy indication.

4. A method according to claim 1, wherein the print data not intended for the recipient is deferred by being temporarily stored and a reference to a print data storage location is sent to a print queue until the recipient relinquishes control of the printing device's print capabilities.

5. A method according to claim 1, wherein the print data not intended for the recipient is deferred by being rejected by the printing device.

6. A method according to claim 1, wherein, once the recipient has exclusive control of the printing device's print capabilities, the recipient selects which print jobs to print.

7. A method according to claim 6, wherein, once the recipient has gained exclusive control of the printing device's print capabilities, the recipient selects print data to print from a network.

8. A method according to claim 7, wherein the network is an Internet or an intranet.

9. A method according to claim 1, wherein the print data intended for the recipient is stored in a location other than in a print queue and a reference to the stored print data location is provided to the print queue.

10. A method according to claim 1, wherein the recipient gains exclusive control of the printing device's print capabilities by being authenticated utilizing a smart card device.

11. A method according to claim 1, wherein the recipient gains exclusive control of the printing device's print capabilities by being authenticated utilizing a keypad and entering a user code, a personal identification amber, or a password.

12. A method according to claim 1, wherein the recipient gains exclusive control of the printing device's print capabilities by being authenticated utilizing a biometric device.

13. A method according to claim 1, wherein said step of providing exclusive control of the printing device's print capabilities includes verifying that the recipient is authorized to obtain exclusive control of the printing device's print capabilities.

14. A method according to claim 1 further comprising the steps of:
   tracking printing device resources utilized in printing data during the period in which the recipient has exclusive control of the printing device's print capabilities; and
   correlating the tracked resources to the authenticated recipient.

15. A method according to claim 14, wherein the tracked resources comprise at least one of a number of printed pages, recording medium type, and amount of ink, toner or other medium utilized in printing the data.

16. An apparatus for printing images, comprising:
   an authentication device that authenticates a recipient;
   a print engine controlling printing operations of the apparatus;
   print queue temporarily storing and buffering print data submitted to the apparatus for printing; and
   control means for providing a recipient control over print capabilities of the apparatus after the recipient has been authenticated,
   wherein, after the recipient is authenticated, print data not intended for the recipient, which is stored by the print queue prior to print data intended for the recipient, is temporarily deferred from being printed and print data intended for the recipient is printed out during a period in which the recipient has control over the apparatus' print capabilities.

17. An apparatus according to claim 16, wherein the recipient gains exclusive control of the printing device's print capabilities by being authenticated utilizing a hardware token.

18. An apparatus according to claim 16, wherein the print data not intended for the recipient is deferred by the apparatus providing a busy indication.

19. An apparatus according to claim 16, wherein the print data not intended for the recipient is deferred by being temporarily stored and a reference to a print data storage location being sent to a print queue until the recipient relinquishes control of the apparatus' print capabilities.

20. An apparatus according to claim 16, wherein the print data not intended for the recipient is deferred by being rejected by the apparatus.

21. An apparatus according to claim 16 further comprising a print job selection device, wherein, once the recipient has control of the apparatus' print capabilities, the recipient selects which print jobs to print.

22. An apparatus according to claim 21, wherein the selection device provides an interface with an network such that, once the recipient has gained control of the printing device's print capabilities, the recipient selects print data to print from the network.

23. An apparatus according to claim 22, wherein the network is an Internet or an intranet.

24. An apparatus according to claim 16, wherein the print data intended for the recipient is stored in a location other than in the print queue and a reference to the stored print data location is provided to the print queue.

25. An apparatus according to claim 16, wherein the recipient gains control of the apparatus' print capabilities by being authenticated utilizing a smart card device.

26. An apparatus according to claim 16, wherein the recipient gains control of the apparatus' print capabilities by being authenticated utilizing a keypad and entering a user code, a personal identification number, or a password.

27. An apparatus according to claim 16, wherein the recipient gains control of the apparatus' print capabilities by being authenticated utilizing a biometric device.

28. An apparatus according to claim 16 further comprising:
a tracking device that tracks printing resources utilized in printing data during the period in which the recipient has control over to the apparatus' print capabilities; and
a correlating device that correlates the tracked resources to the authenticated recipient.

29. An apparatus according to claim 28, wherein the tracked resources comprise at least one of a number of printed pages, recording medium type, and amount of ink, toner or other medium utilized in printing the data.

30. A computer readable medium on which is stored a computer executable program performing a method for obtaining exclusive control of a printing device's print capabilities by a recipient to print data intended for the recipient, the comprising:
authenticating the recipient;
providing the recipient exclusive control of the printing device's print capabilities after the recipient has been authenticated; and
temporarily deferring print data not intended for the recipient, which is input to the printing device prior to print data intended for the recipient, from being printed and printing print data intended for the recipient during a period in which the recipient has exclusive control of the printing device's print capabilities.

31. A computer readable medium according to claim 30, wherein the recipient gains exclusive control of the printing device's print capabilities by being authenticated utilizing a hardware token.

32. A computer readable medium according to claim 30, wherein the print data not intended for the recipient is deferred by the printing device providing a busy indication.

33. A computer readable medium according to claim 30, wherein the print data not intended for the recipient is deferred by being temporarily stored and a reference to a print data storage location being sent to a print queue until the recipient relinquishes control of the printing device's print capabilities.

34. A computer readable medium according to claim 30, wherein the print data not intended for the recipient is deferred by being rejected by the printing device.

35. A computer readable medium according to claim 30, wherein, once the recipient has exclusive control of the printing device's print capabilities, the recipient selects which print jobs to print.

36. A computer readable medium according to claim 35, wherein, once the recipient has gained exclusive control of the printing device's print capabilities, the recipient selects print data to print from a network.

37. A computer readable medium according to claim 36, wherein the network is an Internet or an intranet.

38. A computer readable medium according to claim 30, wherein the print data intended for the recipient is stored in a location other than in a print queue and a reference to the stored print data location is provided to the print queue.

39. A computer readable medium according to claim 30, wherein the recipient gains exclusive control of the printing device's print capabilities by being authenticated utilizing a smart card device.

40. A computer readable medium according to claim 30, wherein the recipient gains exclusive control of the printing device's print capabilities by being authenticated utilizing a keypad and entering a user code, a personal identification number or a password.

41. A computer readable medium according to claim 30, wherein the recipient gains exclusive control of the printing device's print capabilities by being authenticated utilizing a biometric device.

42. A computer readable medium according to claim 30, wherein said step of providing exclusive control of the printing device's print capabilities includes verifying that the recipient is authorized to obtain exclusive control of the printing device's print capabilities.

43. A computer readable medium according to claim 30, further comprising the steps of:
tracking printing device resources utilized in printing data during the period in which the recipient has exclusive control of the printing device's print capabilities; and
correlating the tracked resources to the authenticated recipient.

44. A computer readable medium according to claim 43, wherein the tracked resources comprise at least one of a number of printed pages, recording medium type, and amount of ink, toner or other medium utilized in printing the data.

45. A method of printing images on a printing device, comprising the steps of:
providing a recipient which has been authenticated with control over printing operations of the printing device; and performing a process to print out an image, intended for the recipient which has been authenticated, by the printing device during a period of control over the printing device, wherein an image not intended for the recipient, which is input to the printing device prior to the image intended for the recipient, is deferred from being printed during the period of control over the printing device.

46. A method according to claim 45, wherein the control step comprises deferring of all print jobs submitted to a print queue for printing by the printing device.

47. A method according to claim 46, wherein the performing step comprises accessing at least one print job in the print queue.

48. A method according to claim 45, wherein the control step comprises control over all communication interfaces of the printing device.

49. A method according to claim 45, wherein the control step comprises control over network access to the printing device.

50. A method according to claim 45, wherein control over the print operations comprises control over print engine operations of the printing device.

51. A method according to claim 45, wherein the performing step comprises accessing print data over a network to be printed by the printing device.

52. A method according to claim 51, wherein the network is an Internet or an intranet.

53. A method according to claim 45, wherein the performing step comprises performing a copying operation.

54. A method according to claim 45, wherein the performing step comprises performing a facsimile operation.

55. A method according to claim 45, wherein the providing control step comprises authenticating the recipient.

56. A method according to claim 55, further comprising the steps of:
   tracking printing device resources utilized during the performing step; and
   correlating the tracked resources to the authenticated recipient.

57. A method according to claim 56, wherein the tracked resources comprise at least one of a number of printed pages, recording medium type, and amount of ink, toner or other medium utilized in the performing step.

58. A method of controlling printing operations of a printing device, comprising the steps of:
   providing a recipient who has been authenticated with control over the printing operations of the printing device; and
   maintaining control over the printing operations until control is manually relinquished by the recipient who has obtained control,
   wherein an image not intended for the recipient, which is input to the printing device before the recipient is provided with control over the printing operations of the printing device, is deferred from being printed until control is manually relinquished by the recipient.

59. A method according to claim 58, wherein the recipient performs a process to access print data to print out an image by the printing device while control is maintained over the printing device.

60. A method according to claim 59, wherein the performing step comprises accessing print data over a network to be printed by the printing device.

61. A method according to claim 60, wherein the network is an Internet or an intranet.

62. A method according to claim 58, wherein the control step comprises deferring of all print jobs submitted to a print queue for printing by the printing device.

63. A method according to claim 62, wherein the performing step comprises accessing at least one print job in the print queue of the printing device.

64. A method according to claim 59, wherein the performing step comprises performing a copying operation.

65. A method according to claim 59, wherein the performing step comprises performing a facsimile operation.

66. A method according to claim 58, wherein the control step comprises control over all communication interfaces of the printing device.

67. A method according to claim 58, wherein the control step comprises control over network access to the printing device.

68. A method according to claim 58, wherein control over the print operations comprises control over print engine operations of the printing device.

69. A method according to claim 58, wherein the providing control step comprises authenticating the recipient.

70. A method according to claim 69, further comprising the steps of:
   the authenticated recipient performing a process to print out an image by the printing device while control is maintained over the printing device;
   tracking printing device resources utilized during the performing step; and
   correlating the tracked resources to the authenticated recipient.

71. A method according to claim 70, wherein the tracked resources comprise at least one of a number of printed pages, recording medium type, and amount of ink, toner or other medium utilized in the performing step.

72. A printing apparatus, comprising:
   a print engine controlling printing operations of the apparatus; and
   a control device for permitting a recipient, who has been authenticated, to obtain control over the printing operations of the apparatus,
   wherein the control device defers printing of print jobs not intended for the recipient, which are input to the apparatus before permitting the recipient to obtain control over the printing operations of the apparatus, during a period of permitting the recipient to obtain control over the printing operations of the apparatus.

73. A printing apparatus according to claim 72, wherein the control device defers printing of all print jobs submitted to a print queue of the apparatus.

74. A printing apparatus according to claim 73, wherein the access device performs a process to access at least one deferred print job in the print queue.

75. A printing apparatus according to claim 72, wherein the control device controls all communication interfaces of the apparatus.

76. A printing apparatus according to claim 72, wherein the control device controls network access to the apparatus.

77. A printing apparatus according to claim 72, wherein the control device controls the print engine.

78. A printing apparatus according to claim 72, wherein the access device performs a process to access print data over a network.

79. A printing apparatus according to claim 78, wherein the network is an intranet or an Internet.

80. A printing apparatus according to claim 72, wherein the access device performs a copying process.

81. A printing apparatus according to claim 72, wherein the access device performs a facsimile process.

82. A printing apparatus according to claim 72, wherein the control device comprises an authentication device for performing an authentication process of the recipient.

83. A printing apparatus according to claim 82, further comprising:
a tracking device that tracks printing resources utilized in printing data during a period in which the recipient has control of the printing operations; and
a correlating device that correlates the tracked resources to the recipient.

84. A printing apparatus according to claim 83, wherein the tracked resources comprise at least one of a number of printed pages, recording medium type, and amount of ink, toner or other medium utilized in printing the data.

85. A printing apparatus, comprising:
a print engine controlling printing operations of the apparatus;
a control device for permitting a recipient, who has been authenticated, to obtain control over the printing operations of the apparatus and to maintain control until a time when the recipient relinquishes control; and
a relinquishing device for relinquishing control over the apparatus' printing operations,
wherein the control device defers printing of print jobs not intended for the recipient, which are input to the apparatus before permitting the recipient to obtain control over the printing operations of the apparatus until the time when the recipient relinquishes control.

86. A printing apparatus according to claim 85, further comprising a print data access device for performing a process to access print data to be printed by the printing apparatus during a period in which the recipient has control over the printing device.

87. A printing apparatus according to claim 86, wherein the access device performs a process to access print data over a network.

88. A printing apparatus according to claim 87, wherein the network is an intranet or an Internet.

89. A printing apparatus according to claim 86, wherein the access device performs a process to access at least one deferred print job in a print queue.

90. A printing apparatus according to claim 86, wherein the access device performs a copying process.

91. A printing apparatus according to claim 86, wherein the access device performs a facsimile process.

92. A printing apparatus according to claim 85, wherein the control device defers printing of all print jobs submitted to a print queue of the apparatus.

93. A printing apparatus according to claim 85, wherein the control device controls all communication interfaces of the apparatus.

94. A printing apparatus according to claim 85, wherein the control device controls network access to the apparatus.

95. A printing apparatus according to claim 85, wherein the control device controls the print engine.

96. A printing apparatus according to claim 85, wherein the control device comprises an authentication device for performing an authentication process of the recipient.

97. A printing apparatus according to claim 96, further comprising:
a tracking device that tracks printing resources utilized in printing data during a period in which the recipient has control of the printing operations; and
a correlating device that correlates the tracked resources to the recipient.

98. A printing apparatus according to claim 97, wherein the tracked resources comprise at least one of a number of printed pages, recording medium type, and amount of ink, toner or other medium utilized in printing the data.

99. A computer readable medium on which is stored a computer executable program for performing a method for printing images on a printing device, comprising the steps of:
providing a recipient which has been authenticated with control over printing operations of the printing device; and
performing a process to print out an image, intended for the recipient which has been authenticated, by the printing device during a period of control over the printing device,
wherein an image not intended for the recipient, which is input to the printing device prior to the image intended for the recipient, is deferred from being printed during the period of control over the printing device.

100. A computer readable medium according to claim 99, wherein the control step comprises deferring of all print jobs submitted to a print queue for printing by the printing device.

101. A computer readable medium according to claim 100, wherein the performing step comprises accessing at least one print job in the print queue.

102. A computer readable medium according to claim 99, wherein the control step comprises control over all communication interfaces of the printing device.

103. A computer readable medium according to claim 99, wherein the control step comprises control over network access to the printing device.

104. A computer readable medium according to claim 99, wherein control over the print operations comprises control over print engine operations of the printing device.

105. A computer readable medium according to claim 99, wherein the performing step comprises accessing print data over a network to be printed by the printing device.

106. A computer readable medium according to claim 105, wherein the network is an Internet or an intranet.

107. A computer readable medium according to claim 99, wherein the performing step comprises performing a copying operation.

108. A computer readable medium according to claim 99, wherein the performing step comprises performing a facsimile operation.

109. A computer readable medium according to claim 99, wherein the providing control step comprises authenticating the recipient.

110. A computer readable medium according to claim 109, further comprising the steps of:
tracking printing device resources utilized during the performing step; and
correlating the tracked resources to the recipient.

111. A computer readable medium according to claim 110, wherein the tracked resources comprise at least one of a number of printed pages, recording medium type, and amount of ink, toner or other medium utilized in the performing step.

112. A computer readable medium on which is stored a computer executable program for performing a method for controlling printing operations of a printing device, comprising the steps of:
providing a recipient who has been authenticated with control over the printing operations of the printing device; and
maintaining control over the printing operations until control is manually relinquished by the recipient who has been provided with control, wherein an image not intended for the recipient, which is input to the printing device before providing the recipient with control over the printing operations of the printing device, is deferred from being printed until control is manually relinquished by the recipient.

113. A computer readable medium according to claim 112, wherein the recipient performs a process to access print data to print out an image by the printing device while control is maintained over the printing device.

114. A computer readable medium according to claim 113, wherein the performing step comprises accessing print data over a network to be printed by the printing device.

115. A computer readable medium according to claim 114, wherein the network is an Internet or an intranet.

116. A computer readable medium according to claim 113, wherein the performing step comprises accessing at least one print job in a print queue of the printing device.

117. A computer readable medium according to claim 113, wherein the performing step comprises performing a copying operation.

118. A computer readable medium according to claim 113, wherein the performing step comprises performing a facsimile operation.

119. A computer readable medium according to claim 112, wherein the control step comprises deferring of all print jobs submitted to a print queue for printing by the printing device.

120. A computer readable medium according to claim 112, wherein the control step comprises control over all communication interfaces of the printing device.

121. A computer readable medium according to claim 112, wherein the control step comprises control over network access to the printing device.

122. A computer readable medium according to claim 112, wherein control over the print operations comprises control over print engine operations of the printing device.

123. A computer readable medium according to claim 112, wherein the providing control step comprises authenticating the recipient.

124. A computer readable medium according to claim 123, further comprising the steps of:
   the recipient performing a process to access print data to print out an image by the printing device while control is maintained over the printing device;
   tracking printing device resources utilized during the performing step; and
   correlating the tracked resources to the recipient.

125. A computer readable medium according to claim 124, wherein the tracked resources comprise at least one of a number of printed pages, recording medium type, and amount of ink, toner or other medium utilized in the performing step.

* * * * *